US012352473B2

(12) United States Patent
Gan et al.

(10) Patent No.: US 12,352,473 B2
(45) Date of Patent: Jul. 8, 2025

(54) BEAM-CONTROLLED SPECTRAL-SELECTIVE ARCHITECTURE FOR A RADIATIVE COOLER

(71) Applicants: The Research Foundation for The State University of New York, Buffalo, NY (US); Wisconsin Alumni Research Foundation, Madison, WI (US)

(72) Inventors: Qiaoqiang Gan, Amherst, NY (US); Lyu Zhou, Amherst, NY (US); Zongfu Yu, Madison, WI (US); Haomin Song, Williamsville, NY (US)

( * ) Notice: Subject to any disclaimer, the term of this patent is extended or adjusted under 35 U.S.C. 154(b) by 724 days.

(21) Appl. No.: 17/269,117

(22) PCT Filed: Aug. 19, 2019

(86) PCT No.: PCT/US2019/047117
§ 371 (c)(1),
(2) Date: Feb. 17, 2021

(87) PCT Pub. No.: WO2020/037328
PCT Pub. Date: Feb. 20, 2020

(65) Prior Publication Data
US 2021/0254869 A1 Aug. 19, 2021

Related U.S. Application Data

(60) Provisional application No. 62/719,543, filed on Aug. 17, 2018.

(51) Int. Cl.
*F25B 23/00* (2006.01)
*F24S 70/10* (2018.01)
(Continued)

(52) U.S. Cl.
CPC ............ *F25B 23/003* (2013.01); *F24S 70/10* (2018.05); *F24S 70/225* (2018.05); *F24S 70/60* (2018.05);
(Continued)

(58) Field of Classification Search
CPC .. F24S 70/10; F24S 50/80; F24S 70/60; F24S 70/225; F25B 23/003; G01K 1/16; F28F 13/18; F28F 2245/06; G02B 17/004
See application file for complete search history.

(56) References Cited

U.S. PATENT DOCUMENTS

| 4,624,113 A | 11/1986 | Hull et al. |
| 5,696,865 A | 12/1997 | Beeson et al. |

(Continued)

FOREIGN PATENT DOCUMENTS

| DE | 102010029570 A1 | 12/2011 |
| EP | 1054271 A2 | 11/2000 |
| WO | 2016/205717 A1 | 12/2016 |

OTHER PUBLICATIONS

Hu, M., et al., Theoretical and Experimental Study of Spectral Selectivity Surface for Both Solar Heating and Radiative Cooling, International Journal of Photoenergy, Aug. 3, 2015, vol. 2015, pp. 1-9.

(Continued)

*Primary Examiner* — Alfred Basichas
(74) *Attorney, Agent, or Firm* — Hodgson Russ LLP

(57) ABSTRACT

A passive cooler of the disclosure includes a thermal emitter having a substrate and a coating disposed on at least a portion of a first side of the substrate. The cooler has a beam guide made from a material having a high absorption to solar wavelengths and high reflectance at mid-infrared wavelengths. The beam guide is configured such that at least a portion of incident light is acted on by the beam guide before
(Continued)

reaching the thermal emitter. In some embodiments, the beam guide has a graded optical index.

17 Claims, 23 Drawing Sheets

(51) Int. Cl.
*F24S 70/225* (2018.01)
*F24S 70/60* (2018.01)
*F28F 13/18* (2006.01)
*G01K 1/16* (2006.01)

(52) U.S. Cl.
CPC ................ *F28F 13/18* (2013.01); *G01K 1/16* (2013.01); *F28F 2245/06* (2013.01)

(56) References Cited

U.S. PATENT DOCUMENTS

| | | |
|---|---|---|
| 8,483,533 B1 | 7/2013 | Mehl |
| 9,709,349 B2 | 7/2017 | Raman et al. |
| 9,923,111 B2 | 3/2018 | Fan et al. |
| 9,927,188 B2 | 3/2018 | Liu et al. |
| 2006/0023327 A1 | 2/2006 | Coombs et al. |
| 2012/0002291 A1 | 1/2012 | Hong et al. |
| 2015/0131146 A1 | 5/2015 | Fan et al. |
| 2015/0338175 A1 | 11/2015 | Raman et al. |
| 2016/0356561 A1 | 12/2016 | Heltzel |
| 2017/0334024 A1 | 11/2017 | Buller et al. |
| 2018/0023866 A1 | 1/2018 | Chen et al. |
| 2019/0086164 A1 | 3/2019 | Yang et al. |

OTHER PUBLICATIONS

Chen, Z., et al., Radiative cooling to deep sub-freezing temperatures through a 24-h day-night cycle, Nature Communications, Dec. 13, 2016, vol. 7, article No. 13729, pp. 1-5.

Bikram, B. et al., Passive directional sub-ambient daytime radiative cooling, Nature Communications, Nov. 27, 2018, vol. 9, article No. 5001, pp. 1-8.

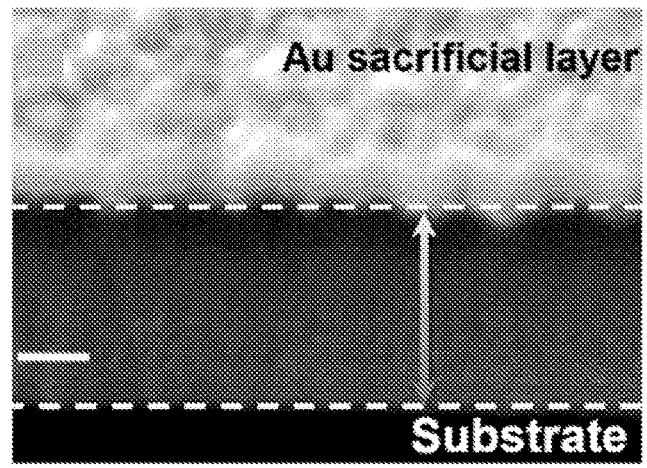
Fig. 12A
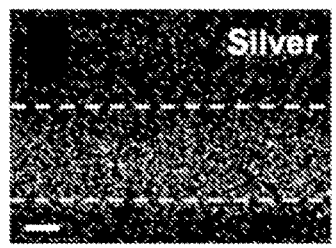 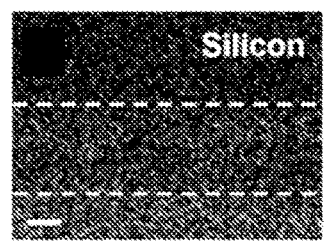
Fig. 12B  Fig. 12C
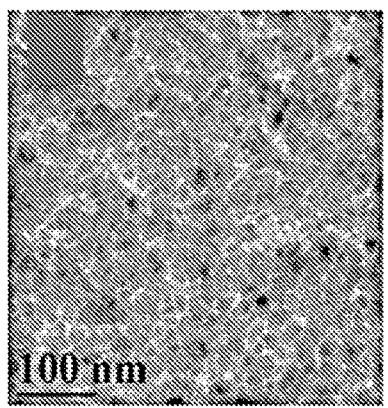 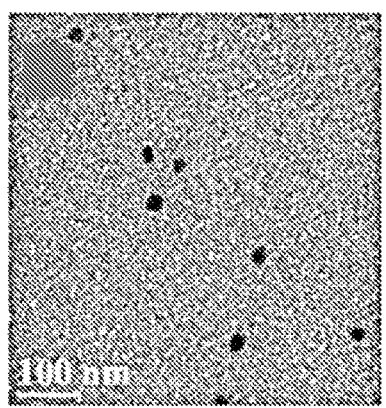 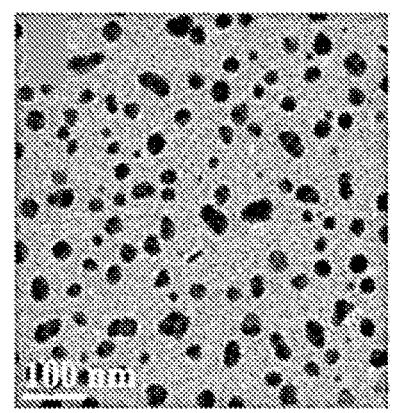
Fig. 12D  Fig. 12E  Fig. 12F

BEAM-CONTROLLED SPECTRAL-SELECTIVE ARCHITECTURE FOR A RADIATIVE COOLER

CROSS-REFERENCE TO RELATED APPLICATIONS

This application claims priority to U.S. Provisional Application No. 62/719,543, filed on Aug. 17, 2018, the disclosure of which is incorporated herein by reference.

STATEMENT REGARDING FEDERALLY SPONSORED RESEARCH OR DEVELOPMENT

This invention was made with government support under Contract Numbers 1932968 and 1932843 awarded by the National Science Foundation. The government has certain rights in the invention.

FIELD OF THE DISCLOSURE

The present disclosure relates to passive radiative coolers.

BACKGROUND OF THE DISCLOSURE

Air conditioning is a significant end-use of energy and a major driver of global peak electricity demand. For instance, air conditioning consumes ~15% of the primary energy used by buildings in the United States and a shocking 70% of total electricity consumption in some tropical countries (e.g., Saudi Arabia). Therefore, a passive cooling strategy that cools without requiring electricity input could have a significant impact on global energy consumption. The Earth's atmosphere has a transparent window for electromagnetic (EM) waves between 8-13 µm, corresponding to the peak thermal radiation spectral range of terrestrial objects at typical ambient temperature (e.g., ~20° C. to 45° C.). This transparent window is a cooling channel, through which a thermal body on the Earth's surface can radiate heat into the cold outer space. This mechanism has been used for nocturnal ice making in India before the invention of refrigerator. In the study of heat management in modern buildings, color and material properties of roofs and windows have been exploited for radiative cooling for decades. Such properties can help to reduce the heat gain through the roof during daytime and to cool the room/house more rapidly after sunset. However, most conventional radiative cooling technologies only work at night since solar heating is dominant during the daytime. To realize all-day continuous cooling, it is essential to achieve efficient radiative cooling during the daytime when peak cooling demand actually occurs.

Recently, record-breaking daytime radiative cooling strategies were demonstrated experimentally using various thermal photonic structures. For instance, a planar multi-layered photonic device for daytime radiative cooling has been reported, which reduced the temperature by 4.9° C. below ambient temperature. However, the multi-layered thermal photonic structure requires nanometer level accuracy in thickness controllability, imposing a cost barrier in practical day-time radiative cooling. To overcome this cost barrier, hybrid metamaterial structures fabricated using roll-to-roll processes were reported with the cooling power of ~100 W/m² during a sunny day with clear sky. This will also help to extend the device lifetime. These pioneering works demonstrated the potential to realize daytime radiative cooling with no electricity consumption. This technology can be used to assist the climate control in buildings, saving a significant portion of energy usage. Therefore, enhanced radiative cooling technology represents a new research topic with significant impact on the energy sustainability. However, the relatively expensive fabrication imposed a cost barrier for practical application of these day-time cooling strategies. Accordingly, there is a need for technologies to improve the thermal management for cooling systems and enhance the performance-to-cost ratio for daytime radiative cooling.

BRIEF SUMMARY OF THE DISCLOSURE

Radiative cooling is a passive cooling strategy with zero consumption of electricity. Although this technology can work well during optimal atmospheric conditions at nighttime, it is advantageous to achieve efficient radiative cooling during daytime when peak cooling demand actually occurs. In this disclosure, we describe an inexpensive planar polydimethylsiloxane (PDMS)/metal thermal emitter thin film structure, which may be fabricated using fast solution coating process that is scalable for large area manufacturing. By manipulating the beaming effect of the thermal radiation, a temperature reduction of 9.5° C. was demonstrated in the laboratory environment. In addition, a spectral-selective solar shelter architecture was designed and implemented to suppress the solar input during the daytime. Due to the enhanced directionality of thermal emission, the dependence of the radiative cooling performance on the surrounding environment was minimized. Outdoor experiments were performed in Buffalo, NY, realizing continuous all-day radiative cooling with a temperature reduction as great as 11.0° C. and an average power of ~120 W/m² on a typical clear sunny day at Northern United States latitudes. This practical passive cooling strategy that cools without any electricity input could have a significant impact on global energy consumption.

DESCRIPTION OF THE DRAWINGS

For a fuller understanding of the nature and objects of the disclosure, reference should be made to the following detailed description taken in conjunction with the accompanying drawings, in which:

FIG. 12A. SEM image of the cross section of exemplary GNM plates. The arrow indicates the grade profile of the density of embedded $SiO_2$ particles. The top Au layer is the sacrificial layer for the SEM imaging FIGS. 12B-12C. EDS element mapping images for silicon (12B) and silver (12C).

FIGS. 12D-12F TEM images of reference sample: (12D) Layer 3, (12E) Layer 5, and (12F) Layer 8.

DETAILED DESCRIPTION OF THE DISCLOSURE

In a first aspect of this disclosure, we describe an inexpensive planar Polydimethylsiloxane (PDMS)/metal thermal emitter thin film structure that is useful for efficient radiative cooling applications over large areas. By manipulating the beaming effect of the thermal radiation, a temperature reduction of 9.5° C. was demonstrated using liquid nitrogen as the cold source in the laboratory environment. In addition, since the usual thermal emission of the planar thermal emitter is omnidirectional, the radiative cooling performance is heavily dependent on the surrounding environment (i.e., the access to the open clear sky). Due to the enhance directionality of the thermal emission, the dependence of the radiative cooling performance on the surrounding environment was minimized. In addition, a spectral-selective solar shelter architecture was designed and implemented to suppress the solar input during the daytime. Outdoor experiments were performed in Buffalo NY, realizing continuous all-day radiative cooling with the best temperature reduction of 11° C. and an average cooling power of ~120 W/m$^2$ on a typical clear sunny day at Northern United States latitudes.

Design and Development of Planar PDMS/Metal Thin Film Thermal Emitters

Figure 1A:
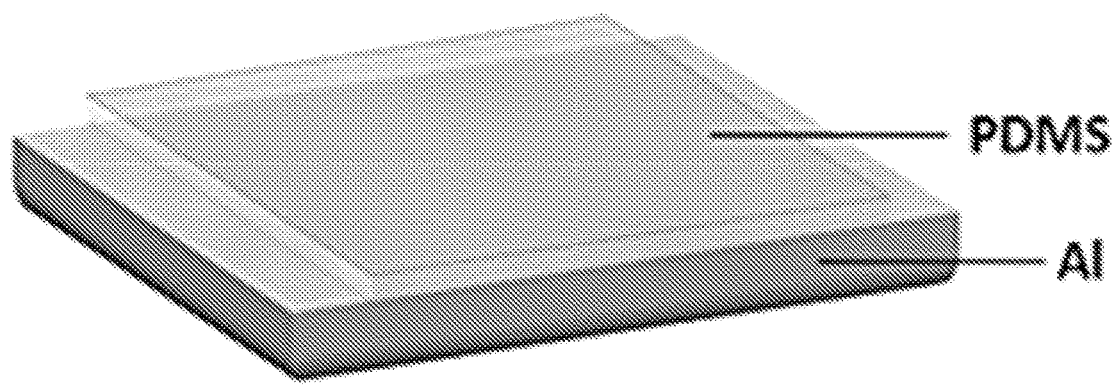
FIG. 1A is a schematic diagram of a planar PDMS/metal thermal emitter.
Figure 1B:
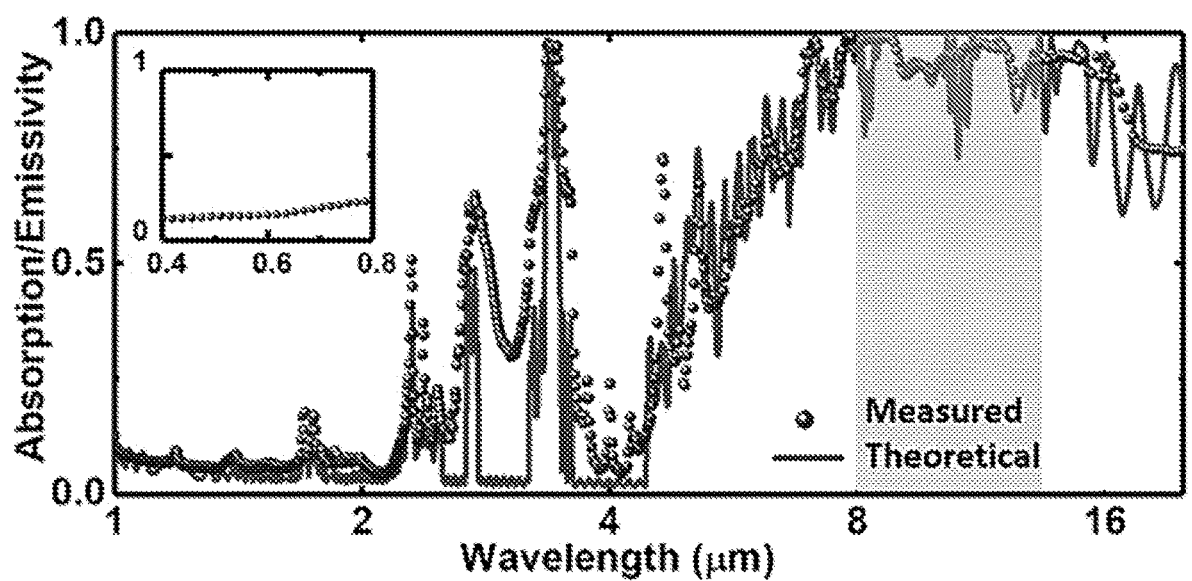
FIG. 1B is an absorption/emissivity spectra of a planar PDMS/Al film with the thickness of 150 µm. Solid curve: numerical modeling; Spheres: measured data.
Figure 1C:
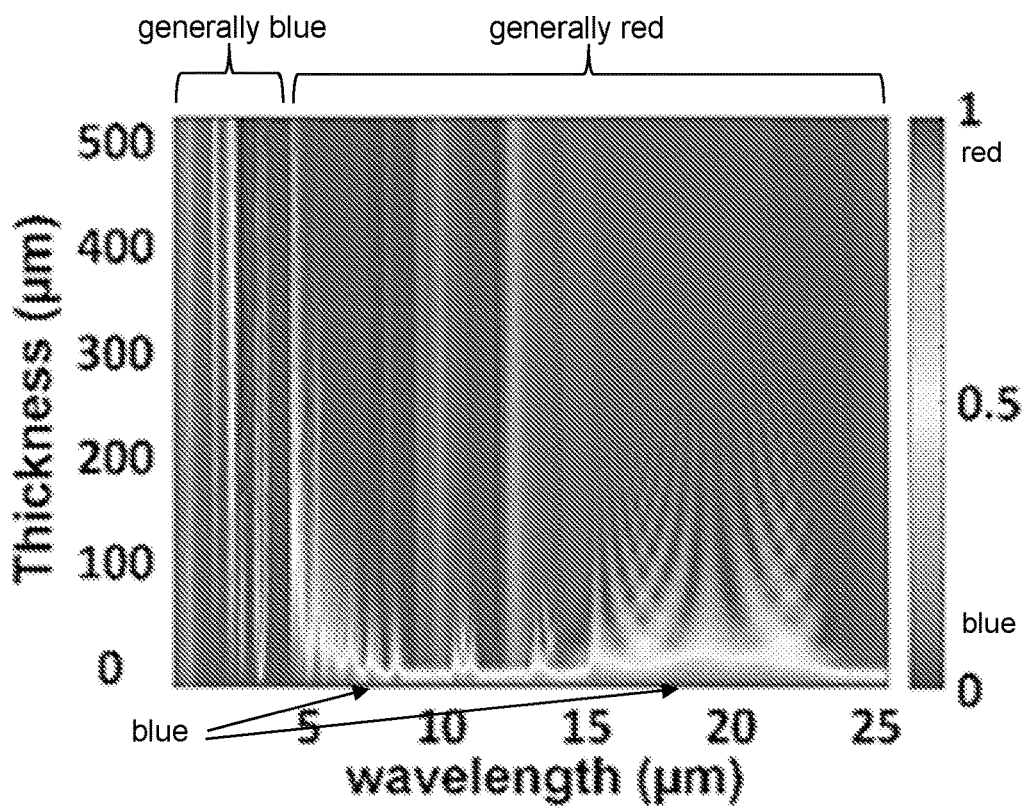
FIG. 1C is a modeled absorption spectra of the planar PDMS/Al film as a function of the PDMS film thickness.
Figure 6:
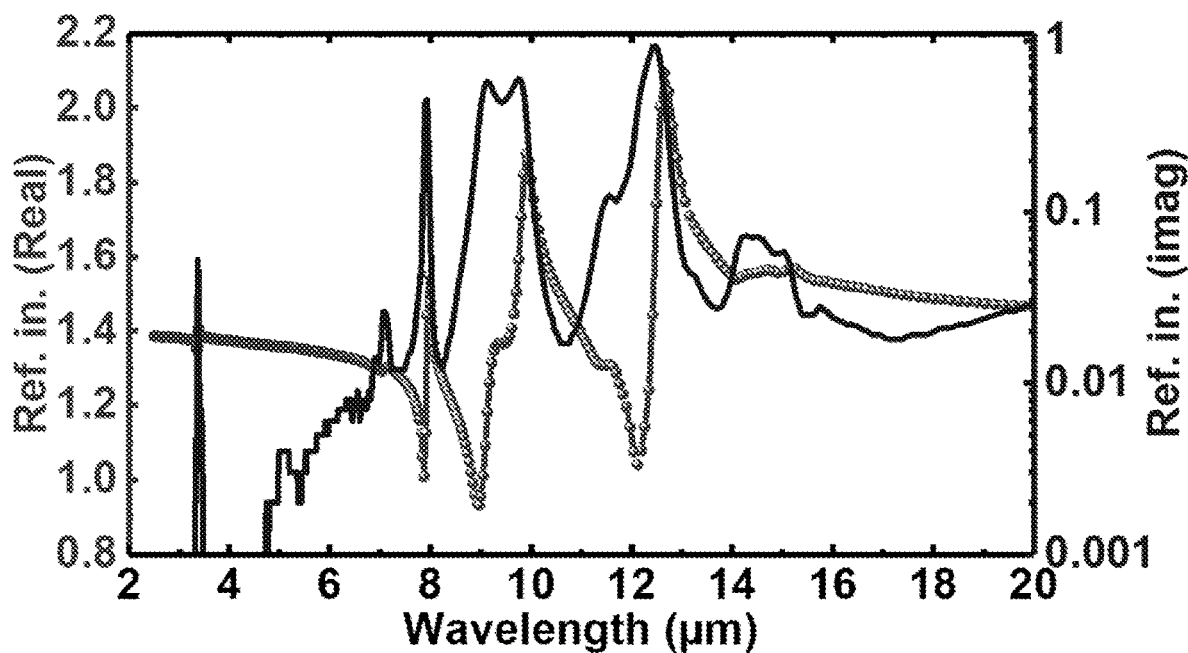
FIG. 6 is a chart showing the real part (spheres) and imaginary part (solid line) of the effective refractive index for PDMS.

Polydimethylsiloxane (PDMS) is a promising inexpensive material for daytime radiative cooling due to its transparency in the visible regime and strong thermal emissivity in the mid-infrared regime. In a recent report, 2.5 μm~16.7 μm thick PDMS films were spin-coated on Au films. Based on their optical absorption properties, the use of such structures for radiative cooling was proposed using numerical modeling. Here we will show that this accurate thickness control is unnecessary for high performance radiative cooling in practice. Instead, we disclose a planar PDMS/metal film (e.g., Al, Ag, or the like) structure to realize an inexpensive thermal emitter for radiative cooling, as illustrated in FIG. 1A. For an exemplary 150 μm PDMS film, the optical absorption of such a structure in the visible to near-IR spectrum domain is relatively weak, which is desirable for daytime radiative cooling (see the inset of FIG. 1B for data measured from an experimental embodiment). According to Kirchhoff's law, the absorption of the emitter corresponds to its emissivity. One can see from measured data shown in FIG. 1B (spheres) that its optical absorption/emissivity in the mid-infrared spectral range is strong, agreeing well with the numerical modeling (see the solid curve, the optical data of PDMS are shown in FIG. 6). To show the thickness-dependence of this type of planar PDMS/metal thermal emitter, the absorption spectra of the thin film system was modeled as the function of the PDMS thickness, as shown in FIG. 1C. One can see interference phenomenon in the wavelength range of 15-25 μm. The absorption/emissivity in the wavelength range of 8-13 μm is close to unity when the PDMS thickness is beyond 100 μm. Therefore, this structure is tolerant of large roughness in a PDMS film with thickness over 100 μm, which is convenient for inexpensive manufacturing over huge scales.

Figure 1D:
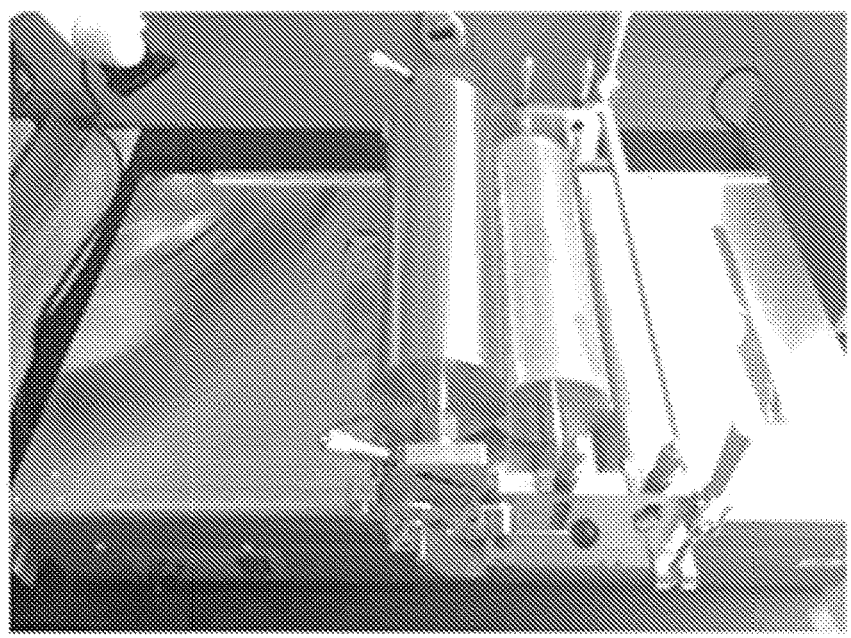
FIG. 1D is a photograph of an exemplary PDMS coating facility under operation.
Figure 1E:
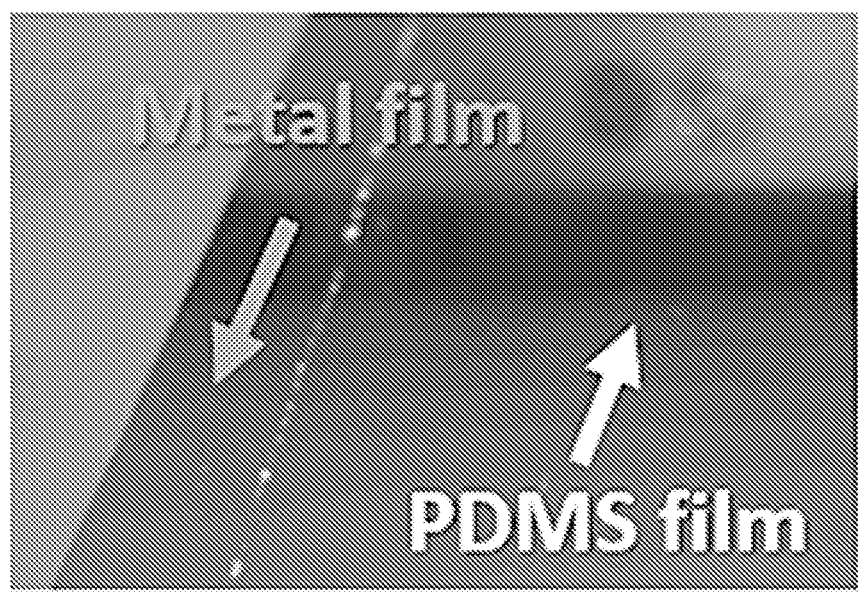
FIG. 1E is a photograph of the edge of a coated PDMS film on an Al plate.
Figure 1F:
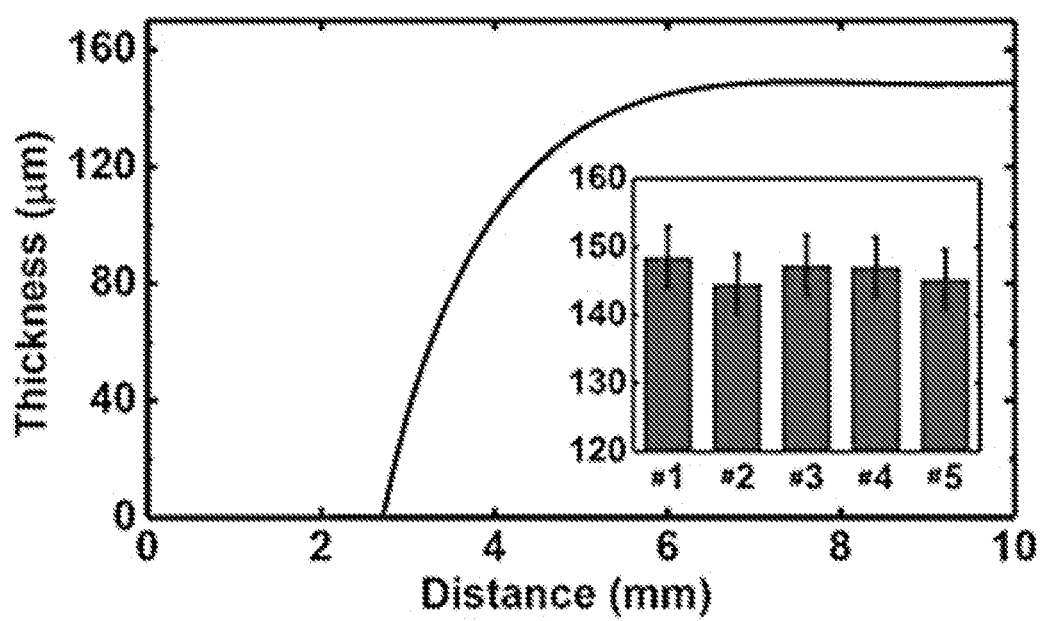
FIG. 1F is a cross-sectional profile of a PDMS film. Inset: Measured thicknesses of five samples.

In a non-limiting test embodiment, a fast coating facility (RK K303 Multicoater, FIG. 1D) was used to fabricate a PDMS layer with controlled thickness (see processing details in Note 1 below). The coating area in this inexpensive exemplary system was ~66×46 cm, demonstrating the potential for low cost and rapid manufacturing compared with multi-layered optical film deposition. After thermal polymerization, a high quality PDMS layer on an aluminum (Al) plate was obtained as shown in FIG. 1E. The thickness was characterized using a probe profilometer (Veeco, Dektak 8 advance development profiler), demonstrating a well-controlled film thickness of ~150 μm (FIG. 1F). Using this rapid process, we fabricated five samples and realized relatively stable control in thickness, as shown by the inset in FIG. 1F. Their optical absorption spectra (i.e., thermal emissivity) were characterized using an FTIR spectroscopy (Bruker Hyperon 1000). As shown in FIG. 1B, the measured data (spheres) agrees well with theoretical modeling (the solid curve). The measured strong emissivity in the 8-13 μm spectral window (~94.6% of ideal blackbody radiation, see the shaded region in FIG. 1B) and weak absorption of solar energy (i.e., less than 10%) will enable high-performance daytime radiative cooling.

Figure 15A:
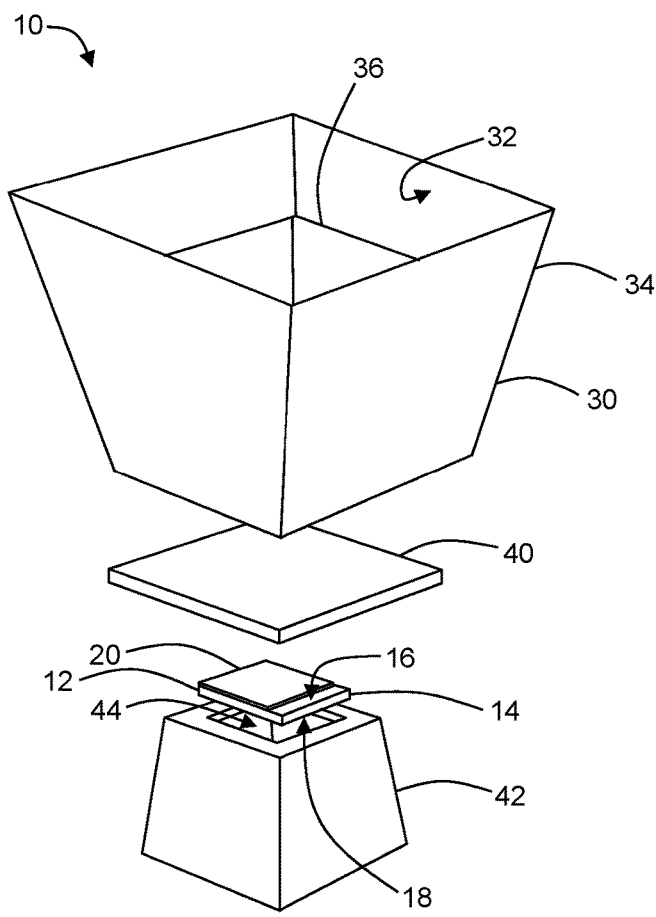
FIG. 15A. An exploded view of a passive cooler according to an embodiment of the present disclosure.
Figure 15B:
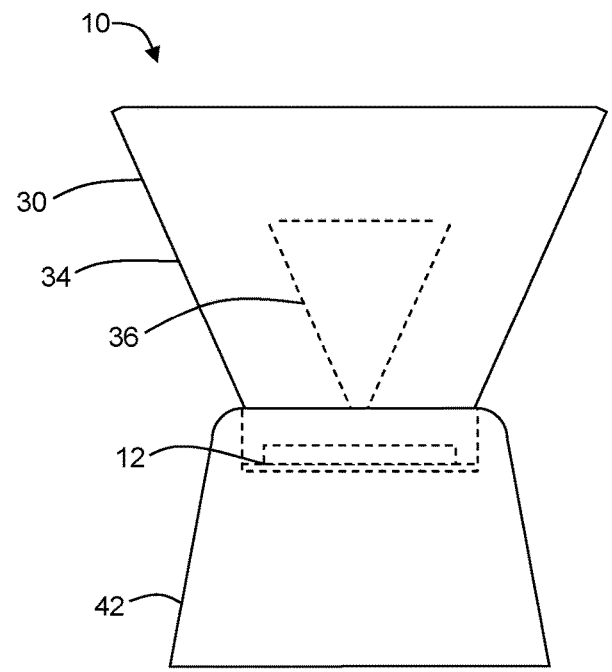
FIG. 15B. A side elevation view of a passive cooler according to an embodiment of the present disclosure.

With reference to FIGS. 15A-15B, the present disclosure may be embodied as a passive cooler 10. The passive cooler 10 includes a thermal emitter 12 having a substrate 14. The substrate 14 may be made from a metal, such as, for example, aluminum, silver, alloys. Other highly-reflective materials (i.e., mirror effect) may be used. The thermal emitter 12 also includes a coating 20 disposed on at least a portion of a first side 16 of the substrate 14. The coating 20 of the thermal emitter 12 is configured to absorb less than 20% of incident sunlight at wavelengths <~2 μm. In some embodiments, the coating is polydimethylsiloxane (PDMS).

The cooler 10 has a beam guide 30 (i.e., a beam-shaping component). The beam guide 30 is made from a material having a high absorption to solar wavelengths (i.e., of electromagnetic radiation) and high reflectance at mid-infrared wavelengths. In some embodiments, the beam guide is configured to absorb more than 40%, 50%, 60%, 70%, or 80% (or any value therebetween) of incident light at wavelengths <~4 μm. In some embodiments, the beam guide is configured to absorb less than 40%, 30%, 20%, 10%, or 5% (or any value therebetween) of incident light at wavelengths from ~4-13 μm.

The beam guide 30 is configured such that at least a portion of incident light is acted on by the beam guide 30 before reaching the thermal emitter 12. In some embodiments, the beam guide 30 has an optical index which is graded over at least a portion of a thickness of the beam guide 30. For example, in some embodiments, the beam guide 30 comprises a graded index film 32. The graded index film is further discussed below under the heading "Graded Index Beam Guide." Such a film 32 may include metal particles, (e.g., nanoparticles) wherein the density of the metal particles varies over at least a portion of a thickness of the film. For example, the metal particles may be suspended in a matrix of the film and the density of the particles in the matrix may vary over the film's thickness. Suitable metal particles include, but are not limited to, silver, gold, copper, aluminum, platinum, and nickel.

The film may further include dielectric particles (e.g., nanoparticles), and the density of such dielectric particles (e.g., suspended in the matrix of the film) may vary over at least a portion of a thickness of the film. The dielectric particles may be made from, for example but not limited to, silicon dioxide ($SiO_2$), aluminum oxide ($Al_2O_3$), titanium dioxide ($TiO_2$), zinc oxide (ZnO), hafnium dioxide ($HfO_2$), and/or silicon nitride.

The graded index film 32 may comprise two or more layers, and at least one of the plurality of layers may have a density of metal particles and/or dielectric particles which is different from the density of corresponding particles in at least one other layer. In this way, the layers may provide the density gradient of the film.

Figure 4A:
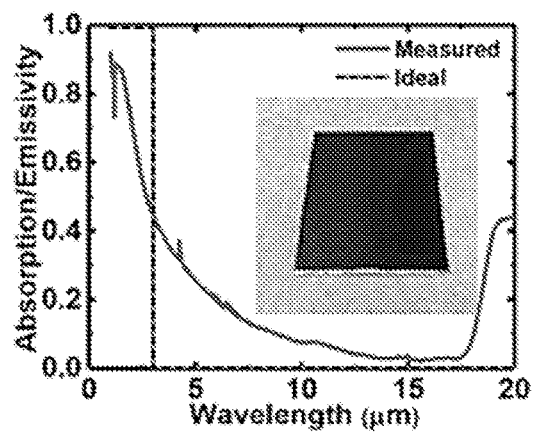
FIG. 4A is a chart showing the absorption spectra of an ideal selective absorber (the gray line) and a commercial spectral selective absorber (the black line).
Figure 4B:
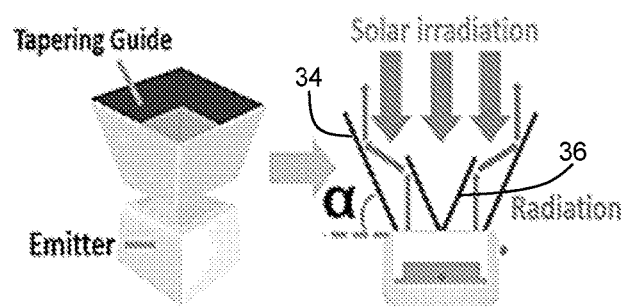
FIG. 4B is a schematic diagram of the cooling system with tapered waveguide structure for thermal emission beam control and suppression of solar input according to an embodiment of the present disclosure.

In some embodiments, the beam guide 30 is made up of an outer member 34 and an inner member 36, which cooperates with the outer member 34 to guide incident light towards the thermal emitter 12 (see, for example, FIG. 4B). The outer member 34 and the inner member 36 may be tapered. The outer member 34 has a spectrally-selectively inner surface configured to reflect mid-infrared light and absorb visible light and near-infrared light. The inner member 36 may have an outer surface similarly configured to reflect mid-infrared light and absorb visible light and near-infrared light.

The passive cooler 10 may have a transparent cover 40 spaced apart from the first side of the substrate 14. The transparent cover 40 may be a transparent material such as, for example, a polyethylene film. The transparent cover 40 may be transparent for solar wavelength, such as, for example, up to 2 µm.

The passive cooler 10 may include a housing 42 having one or more insulative walls. The insulative walls together with a second side 18 of the thermal emitter 12 define a chamber 44 such that the second side 18 of the substrate 12 is exposed to the chamber 44.

Figure 16:
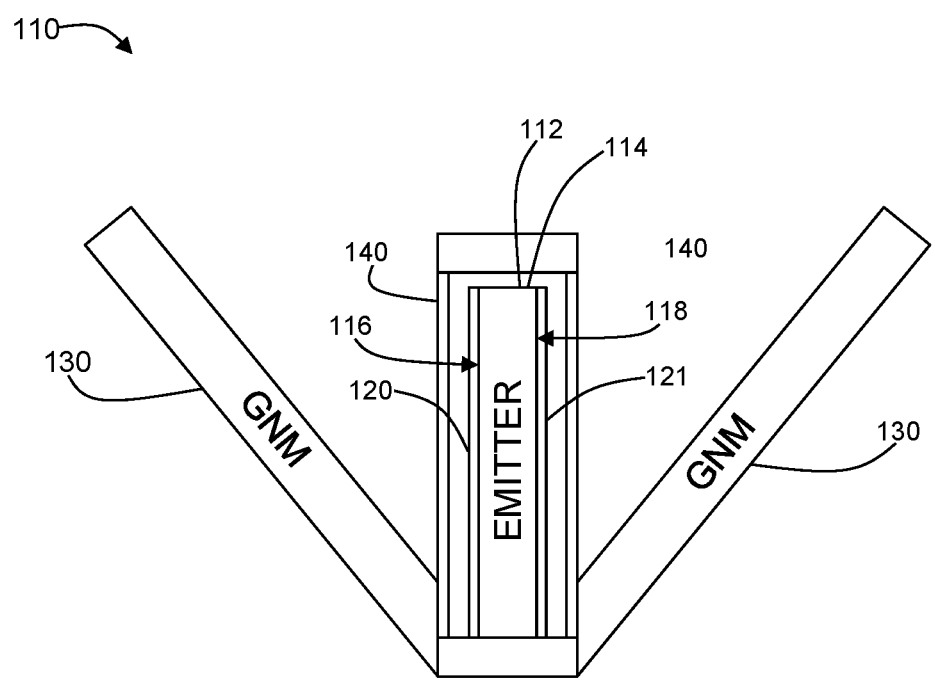
FIG. 16. Diagram of an embodiment of a passive cooler with a V-shaped double-sided emitter of the present disclosure.

FIG. 16 shows another embodiment of a passive cooler 110. In this embodiments, the thermal emitter 112 with a substrate 114 having a first coating 120 on a first side 116 and a second coating 121 on a second side 118. The first coating 120 may be the same as or different from the second coating 121. In an exemplary embodiment, the first and second coatings 120, 121 are PDMS. Transparent covers 140 may be spaced apart from the first side 116 and the second side 118. The cooler 110 includes beam guides 130 configured to direct incident light to the first and second sides of the substrate 114.

In another aspect, the present disclosure may be embodied as a beam guide as in any of the beam guide embodiments described above.

Further discussion and exemplary embodiments are described below including non-limiting prototype embodiments constructed for test purposes.

In embodiments of the present disclosure, a passive cooler includes a thermal emitter having a substrate and a coating disposed on at least a portion of a first side of the substrate. The coating may be configured to have high absorption of incident light at wavelengths greater than 4 µm or approximately 4 µm. For example, the coating may be configured to absorb more than 40%, 50%, 60%, 70%, or 80% (or any value therebetween) of incident light at wavelengths greater than 4 µm. The coating of the thermal emitter may be configured to have low absorption of incident light at wavelengths less than 2 µm or approximately 2 µm. As described above, the substrate may be, for example, aluminum, gold, or other such materials. The coating may be, for example, PDMS.

Indoor Experiment

Figure 2A:
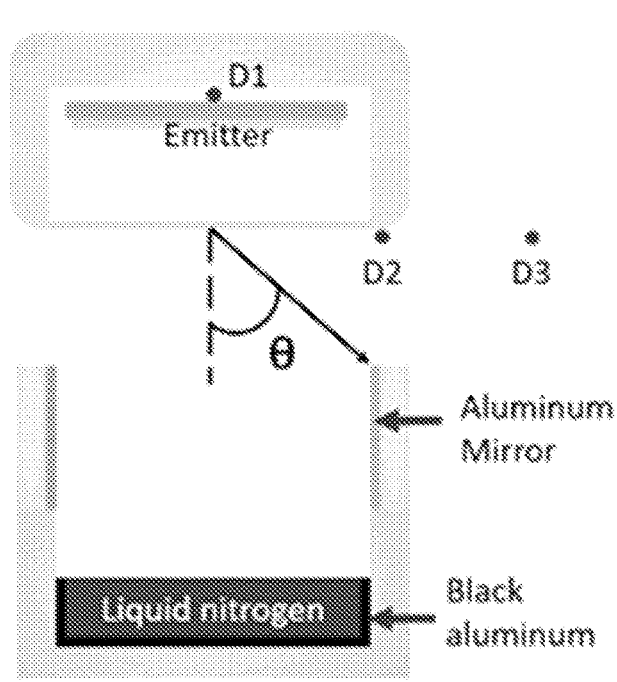
FIG. 2A is a schematic diagram of an experimental setup of an indoor radiative cooling system using liquid nitrogen as a cold source.
Figure 2B:
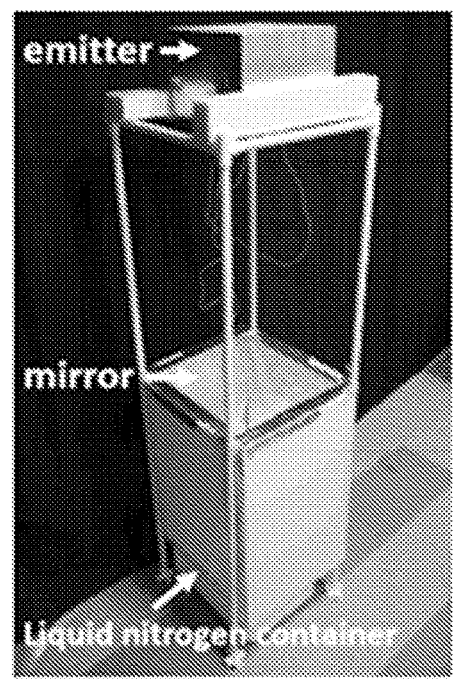
FIG. 2B is a photograph of an experimental setup of FIG. 2A.
Figure 2C:
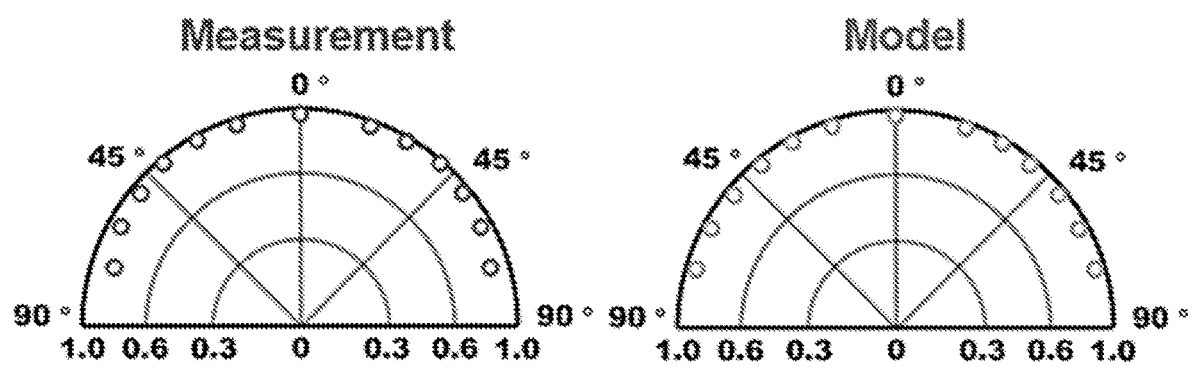
FIG. 2C shows measured (left) and modeled (right) angle-dependent absorption distribution of the planar PDMS/Al cavity emitter at the wavelength of 10 µm.
Figure 7:
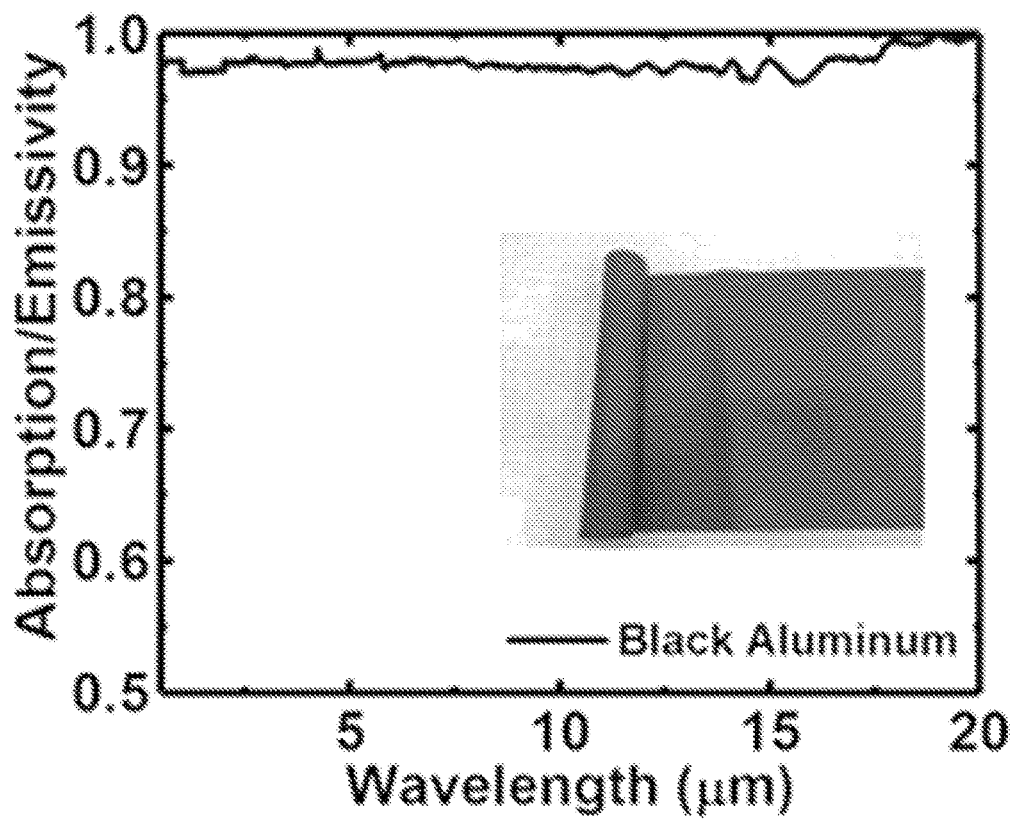
FIG. 7 is a chart showing the measured absorption spectrum of black aluminum cinefoil (Rosco Matte). The inset shows a photograph of Black aluminum cinefoil.

A schematic diagram of an indoor experimental setup is shown in FIG. 2A. We filled a bottom thermal isolating foam tank with liquid nitrogen (at 77K). At the bottom of the tank, we placed a black Al foil to absorb thermal radiation. The black aluminum foil has an optical absorption spectrum from the visible to mid-IR spectral range shown in FIG. 7. In this experiment, the black aluminum foil in liquid nitrogen acted as a cold source. The PDMS/metal emitter was sealed in a thermal isolating foam container using a polyethylene (PE) film, and the emitter was oriented to face the liquid nitrogen tank (with the PDMS film nearest the liquid nitrogen). The distance between the emitter and the cold source was ~1.5 meter (FIG. 2B). Three temperature probes were placed at different positions, as indicated by D1-D3 in FIG. 2A. To show the divergence of the thermal emission from the PDMS/Al emitter, we characterized the angle dependent absorption at a wavelength of 10 µm using the angle module of the FTIR system (Bruker A513 variable angle reflection accessory). One can see in FIG. 2C that the measured thermal emission of this thin film PDMS/Al film is approximately omnidirectional (left panel), agreeing very well with the numerical modeling result (right panel). As such, it is a technical challenge to collect the thermal radiation efficiently to optimize the radiative cooling performance. Beam control of the thermal emission is therefore of interest to address this limitation.

Figure 2D:
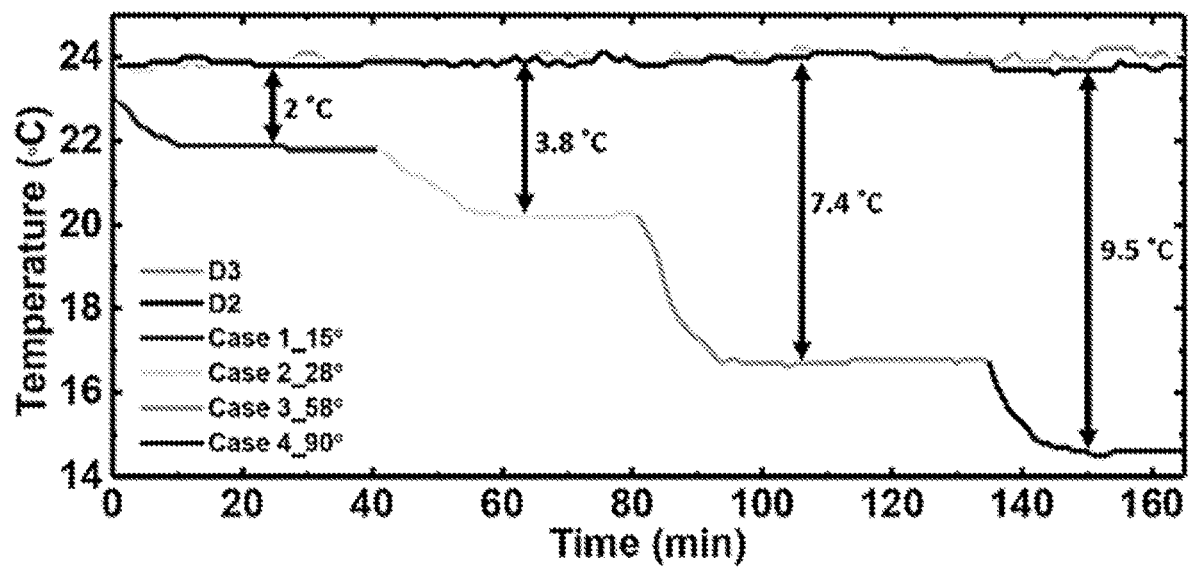
FIG. 2D is a chart showing measured radiative cooling effect with different collection efficiencies (i.e., θ tuned from 15° to) 90°.

In the experiment, we partially or fully connected the output port of the emitter to the cold source using flat Al foils to form a rectangular waveguide tube for thermal emission. These Al mirrors were employed as the side wall to determine the collection angle, θ, as illustrated in FIG. 2A. The resulting cooling effects at different collection angles were observed experimentally and is shown in FIG. 2D. When θ was tuned from 15° to 90°, a temperature difference from 2° C. to 9.5° C. was obtained, depending on the collection efficiency of the thermal radiation. It should be noted that the measured temperature at D2 and D3 are almost the same as each other (black and gray curves, respectively), indicating that the temperature around the emitter box was not affected by the convection of liquid nitrogen. Therefore, the observed cooling effect was mainly introduced by wave-guided thermal radiation.

To interpret the observed indoor radiative cooling performance, we then analyzed the cooling power at each collection angle. The net cooling power, $P_{net}$, is defined below:

$$P_{net} = P_{rad}(T_{dev}) - P_{amb}(T_{amb}) - P_{cold\ source}(T_{lN2}) - P_{non\text{-}rad}(T_{dev}, T_{amb}) \quad (1)$$

Here, $P_{rad}$ is the output power of the PDMS/Al emitter:

$$P_{rad}(T_{dev}) = \int d\Omega \cos(\theta) \int d\lambda I_{BB}(T_{dev}) \varepsilon_{dev}(\lambda), \quad (2)$$

where $T_{dev}$ is the temperature of the emitter; $\Omega$ is the solid angle;

$$I_{BB}(T) = \frac{2hc^2}{\lambda^5 \exp\left(\frac{hc}{\lambda k_B T}\right) - 1} \cdot 1$$

is the spectral radiance of a blackbody at the temperature T; $\varepsilon_{dev}$ is the spectral emissivity/absorptivity of the PDMS/Al film; h is the Planck's constant; $k_B$ is the Boltzmann constant; c is the speed of light; and λ is the wavelength. The incident radiation powers from the ambient, $P_{amb}$, and from the cold source, $P_{cold\ source}$, are given by the following two equations, respectively:

$$P_{amb}(T_{amb}) = \int d\Omega \cos(\alpha) \int d\lambda I_{BB}(T_{amb}) \varepsilon_{air}(\lambda) \quad (3)$$

$$P_{cold\ source} = \int d\Omega \cos(\beta) \int d\lambda I_{BB}(T_{lN2}) \varepsilon_0(\lambda) \quad (4)$$

where $T_{amb}$ is the temperature of the ambient air; $T_{lN2}$ is the temperature of liquid nitrogen; and $\varepsilon_{air}(\lambda)$ and $\varepsilon_0(\lambda)$ is the emissivity/absorptivity of air and the cold black aluminum foil, respectively. It should be noted that the calculated radiation power of the cold source ($P_{cold\ source}$) is negligible compared with other terms in Eq. (1) due to the very low temperature (i.e., 77K) (see detailed discussion in Note 2 below). The last term of Eq. (1), $P_{nonrad}(T_{dev}, T_{amb})$, is the nonradiative power loss because of convection and conduction, which is given by $$P_{nonrad}(T_{dev},T_{amb})=q(T_{dev}-T_{amb}) \quad (5)$$

Here q is the conduction/convection efficiency. In the indoor experiment, the q was defined as 10 W m$^{-2}$K$^{-1}$. Using these equations, the predicted cooling power of the system is plotted in FIG. 2E as the function of the temperature difference, ΔT (i.e., the difference between the PDMS/Al emitter and the ambient). The intersection point at the cooling power of 0 W/m$^2$ indicates the achievable stabilized temperature difference. As the collection angle increases, the intersection points will shift to the left side, indicating the improved cooling performance. Here we calculated the cooling powers of the same emitter with four different collection angles of 15°, 28°, 58°, and 90°, respectively, corresponding to the four experimental tests shown in FIG. 2D. The stabilized temperature differences at four intersection points of dashed line are −2.3° C., −3.7° C., −6.5° C., and −9.2° C., respectively, agreeing well with the measured results shown in FIG. 2D. Next, we further describe the radiative cooling performance by controlling the thermal emission angle in an outdoor test environment.

Outdoor Experiment

Radiative cooling was proposed to reduce the need for air conditioning and its corresponding energy consumption. A clear sky is advantageous for efficient thermal emission. However, the effect of the surrounding environment near the emitter on radiative cooling performance is a practical issue to justify the practical implementation of this passive cooling technology in urban areas. Before we discuss performance of an outdoor experimental system, it is beneficial to analyze the angle dependence of the thermal emission.

Figure 3A:
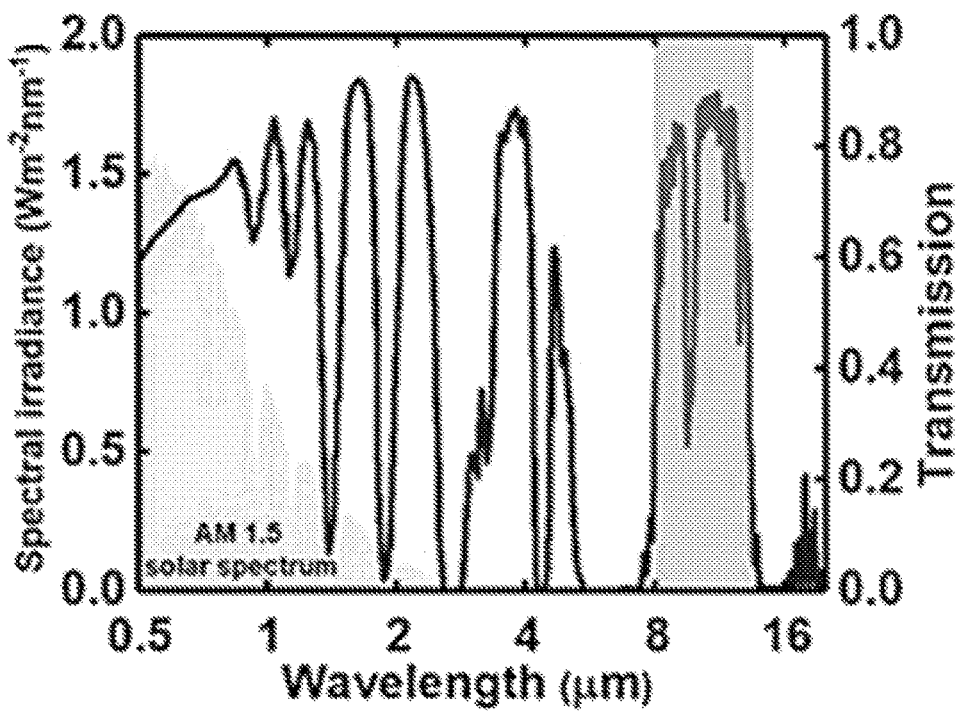
FIG. 3A shows atmospheric transmission spectrum and the solar irradiation spectrum (shaded region labeled solar spectrum).
Figure 3B:
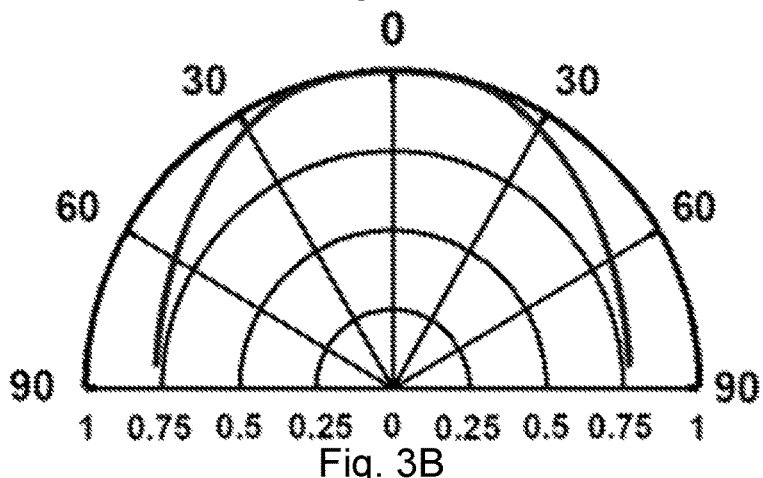
FIG. 3B shows a modeled angle-dependent atmospheric transmission distribution at a wavelength of 10 μm.

The emissivity/absorptivity of the atmosphere at the zenith angle, γ, can be described by:

$$\varepsilon_{air}(\gamma,\lambda)=1-[1-\varepsilon_{air}(0,\lambda)]^{1/\cos\gamma} \quad (6)$$

where $[1-\varepsilon_{air}(0,\lambda)]$ is equal to the modeled atmospheric transmission spectrum shown as the solid line curve in FIG. 3A (data from MODTRAN®). Using this equation, we plotted the angle dependent atmospheric transmission at the wavelength of 10 µm in FIG. 3B. One can see that the thermal emission to the real sky is no longer omnidirectional (in contrast to the indoor analysis shown in FIG. 2C). On the other hand, although the thermal emissivity reduces to ~75% at large emission angles, the structure still emits a significant part of its thermal energy at these angles. Therefore, if the thermal emissions at these large angles is blocked in an outdoor environment by various surrounding architectures, the radiative cooling performance will be affected, as will be validated via experiment as discussed below.

Figure 3C:
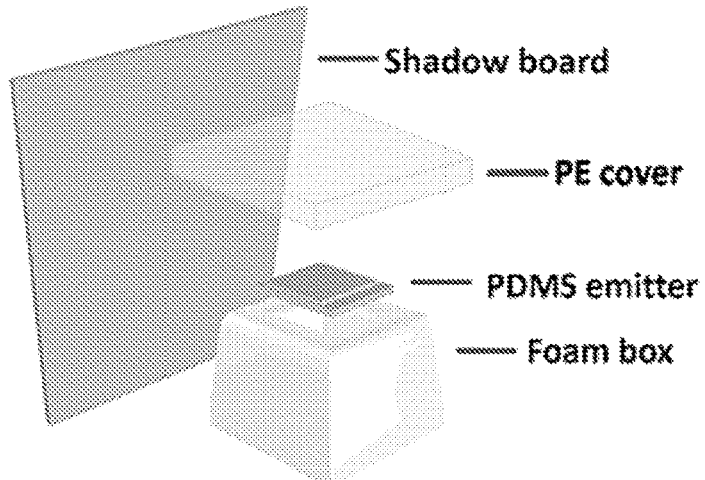
FIG. 3C is a schematic of an outdoor radiative cooling test apparatus according to an embodiment of the present disclosure.
Figure 3D:
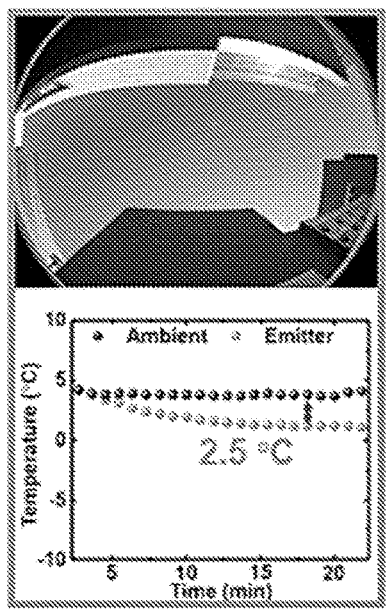
FIG. 3D-3F are charts of measured temperature curves (lower panels) at different locations at the University at Buffalo (upper panels showing a photograph take at each location using a wide-area lens), wherein Location 'A' is shown in FIG. 3D, Location 'B' is shown in FIG. 3E, and Location 'C' is shown in FIG. 3F.
Figure 3E:
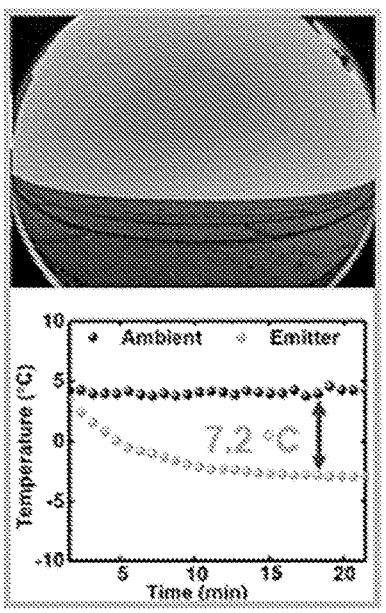
Figure 3F:
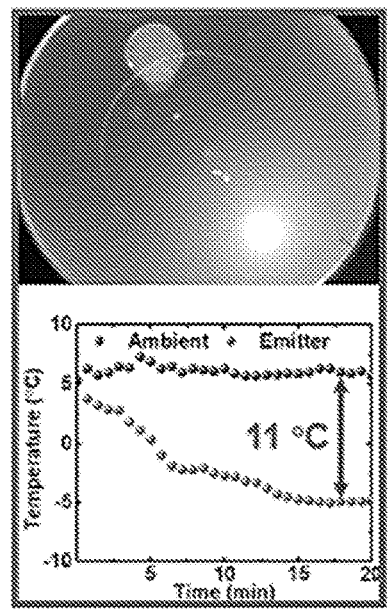
Figure 3G:
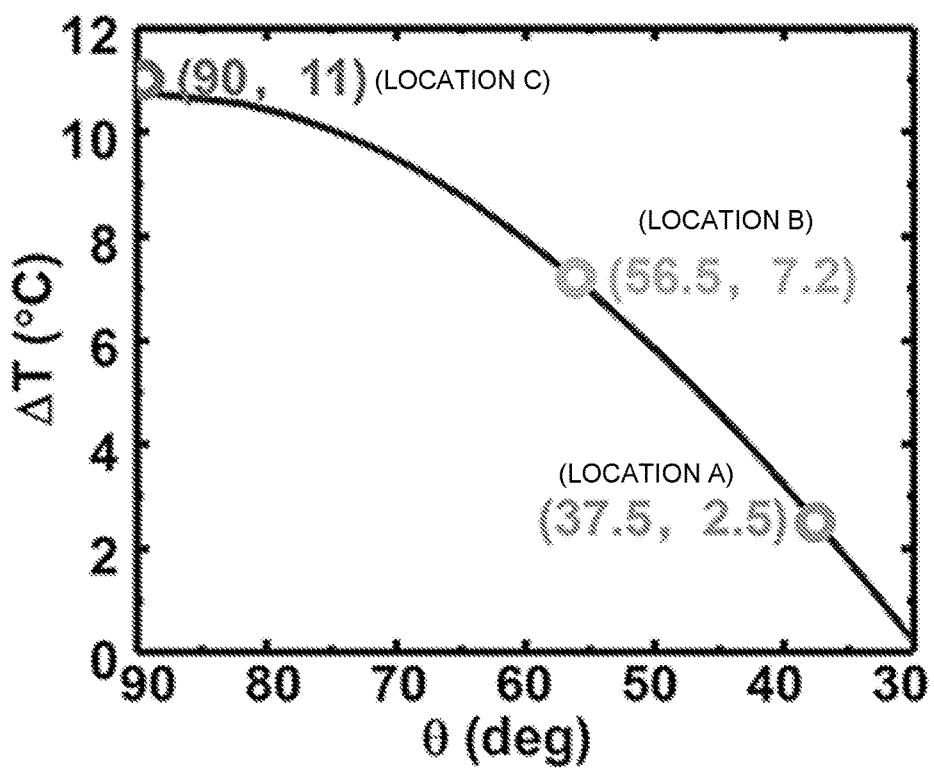
FIG. 3G is a chart showing the calculated temperature reduction as a function of the collection angle, wherein the circles show the measured data extracted from FIGS. 3D-3F.
Figure 8:
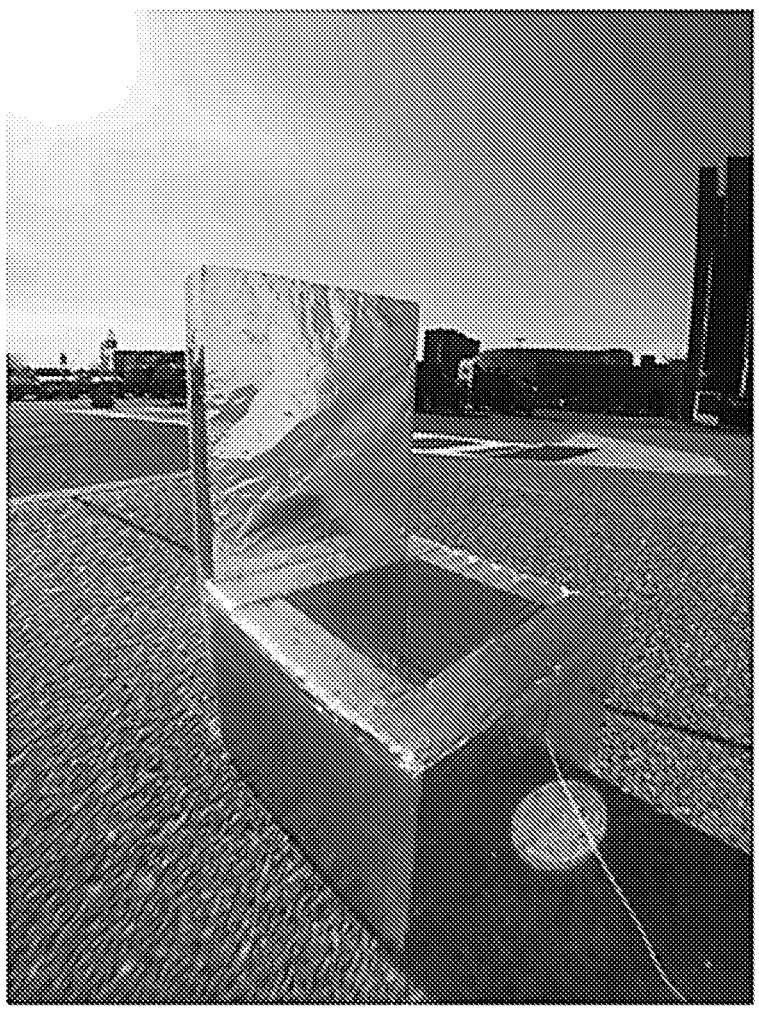
FIG. 8 is a photograph of an experimental setup according to an embodiment of the present disclosure without beaming.

To demonstrate the environmental dependent cooling performance, we performed outdoor tests at three different locations at the University at Buffalo campus from 11:00 a.m. to 3:00 p.m. on Feb. 28, 2018 (with a clear sky and the relative humidity of ~60%). A schematic diagram of the test apparatus is illustrated in FIG. 3C. A planar PDMS/metal emitter was placed at the bottom of a high-density foam container sealed by a PE film. A foam board covered by highly reflective Al foils was placed next to the emitter container to serve as a shadow board (see FIG. 8). The shadow board can create a shadow to block direct sun light illumination (see the spectrum plotted in the shaded region in FIG. 3A), especially within the period with peak solar input. A photograph was taken at each location using a fish-eye lens (AMIR fisheye lens) 180° to demonstrate access to the clear sky (see upper panels of FIGS. 3D-3F, the lens was placed at the top of the shadow board). One can see that access to the clear sky is limited when the emitter is surrounded by tall buildings (FIGS. 3D and 3E). Large open spaces like parking lots are advantageous for radiative cooling (FIG. 3F). Using the test configuration, we obtained temperature reductions of 2.5° C. in FIG. 3D, 7.2° C. in FIG. 3E, and 11° C. in FIG. 3F, respectively. Using Eqs. (1)-(6) (the temperature of the cold source is adapted to 3 K, we further modeled the temperature difference as the function of the collection angle (FIG. 3G). One can see that the estimated cooling performance (solid curve) agrees well with the experimental results extracted from FIGS. 3D-3F (i.e., hollow dots). These results show a practical limitation of implementing radiative cooling technology in urban areas: although all buildings have the access to the clear sky on their roofs, the radiative cooling performance will be affected significantly by surrounding architecture. To overcome this practical limitation, an improved system design is disclosed below which uses a beaming effect of thermal radiation.

A Spectral-Selective Beaming Architecture

Figure 2E:
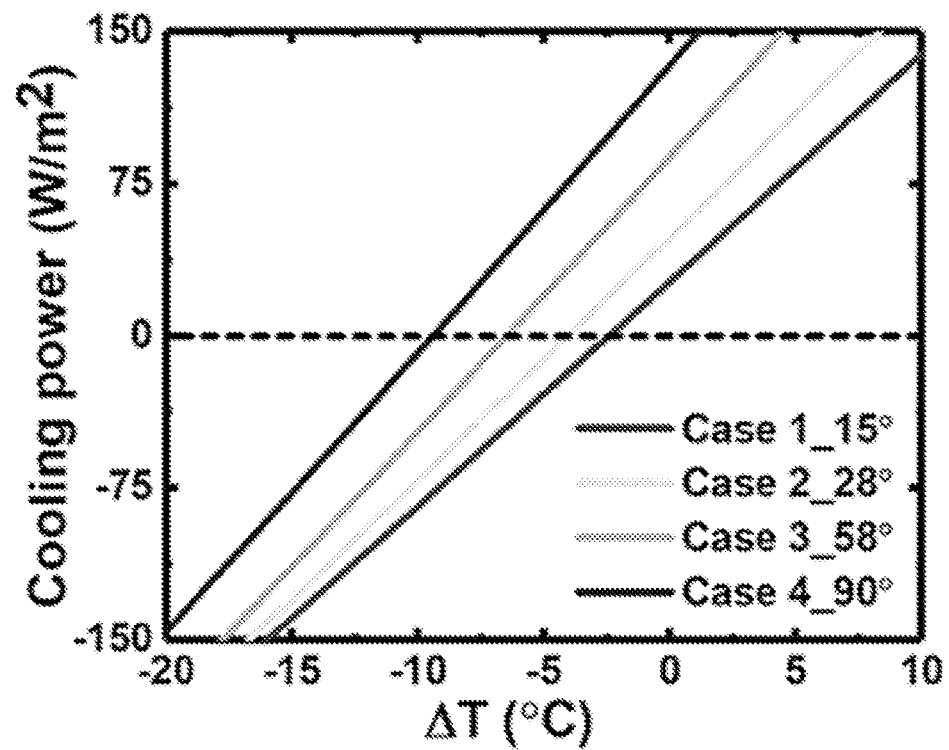
FIG. 2E is a chart showing the calculated cooling power of the 100-μm-thick PDMS/Al cavity emitter within different collection angles from 15° to 90°.
Figure 4C:
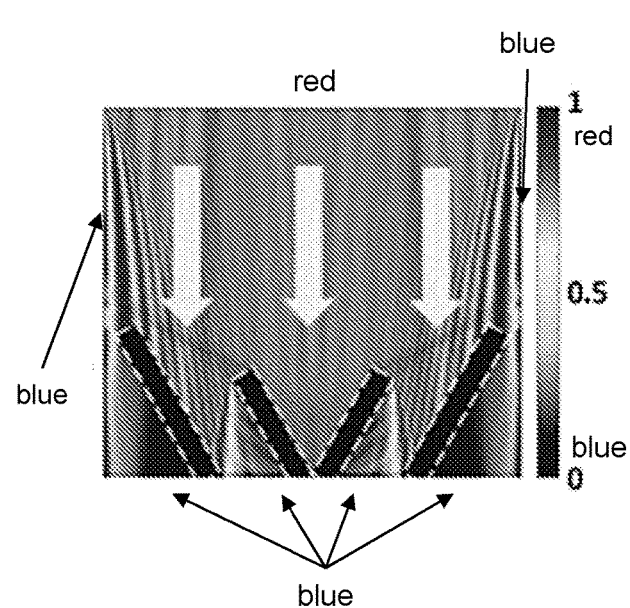
FIG. 4C is a modeled beam propagation distribution with a normal incident solar light (at the wavelength of 500 nm).

According to the calculation shown in FIG. 2E, the cooling power of a planar PDMS/Al system with a collection angle of 90° is ~120 W/m$^2$, corresponding to ~12% of the solar energy. However, as shown in the inset of FIG. 1B, the PDMS film still absorbs part of the solar irradiation in the visible and near-infrared regime. In addition, the Al plates can also lead to the solar absorption at near-infrared wavelengths, which will considerably affect the cooling performance. Therefore, suppression of solar input is an important technical issue for daytime cooling. Here we introduce a spectral-selective absorber material (Bluetec coating solar collector, see the inset in FIG. 4A) in the design of an embodiment of the radiative cooling system. Its optical absorption spectrum is shown as the solid curve of FIG. 4A, with the near-unity absorption of solar illumination and very high reflection in the mid-IR domain (an ideal absorption spectrum as shown by the dashed curve in the figure). In some non-limiting embodiments of selective absorbers, high absorption to solar wavelengths may mean absorbing more than 40%, 50%, 60%, 70%, or 80% or greater (or any value therebetween) of incident light at wavelengths <~4 µm). In some non-limiting embodiments of selective absorbers, very high reflection in the mid-IR domain may mean absorbing less than 40%, 30%, 20%, 10%, or 5% or less (or any value therebetween) of incident light at wavelengths from ~4~13 µm). As illustrated in FIG. 4B, in an embodiment, we used such a spectral selective film to in a tapered waveguide to serve as a beam guide 30. Therefore, most solar energy illuminated on its surface will be absorbed, while the thermal radiation from the planar thermal emitter can be reflected efficiently (right panel in FIG. 4B). Advantageously, this material will not introduce much thermal emission back to the PDMS/Al emitter. At the center of the tapered waveguide, a smaller V-shaped shelter 36 was introduced to block normal incident solar light from directly reaching the emitter. As a result, a feature of this radiative cooling enhancement component is its beaming effect on the mid-IR radiation and the suppression of solar input. As shown by the numerical modeling results in FIG. 4C, the incident solar light was absorbed by the shelter film at a wide range of angles (including the normal incident angle), resulting in a negligible solar input during daytime. By optimizing the taper angle, the mid-infrared wave can be collimated and confined to within a relatively small spatial angle (lower panel in FIG. 4D) compared to the planar system (upper panel in FIG. 4D) (see more modeling details in Note 3 below). Using this beam-controlled enhancement component (FIG. 4E), the impact of the surrounding environment in cooling performance can be greatly suppressed. To validate this prediction, we still placed the system at those three locations at the University of Buffalo (FIGS. 3D-3F) and characterized their radiative cooling performance (two temperature probes were paced at different positions, as indicated by the dots in FIG. 2A). One can see from FIGS. 4F-4H that the temperature reduction is very similar, confirming the independence on the surrounding architectures. More intriguingly, this beam-controlled spectral selective architecture can enable all-day radiative cooling, as will be discussed next.

All-Day Continuous Radiative Cooling

Figure 5A:
FIG. 5A is a photograph of the continuous radiative cooling experiment performed in the backyard of a house at Buffalo during an all-day continuous radiative cooling experiment.
Figure 5B:
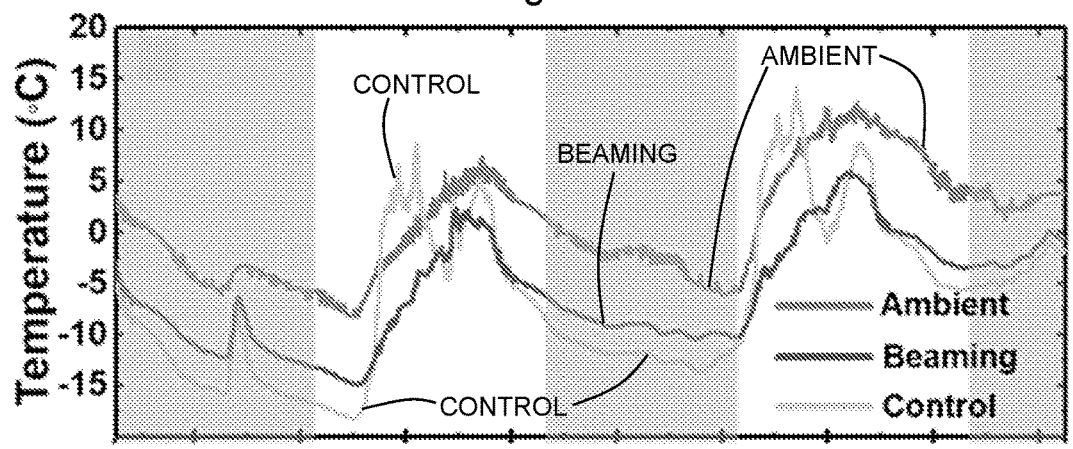
FIG. 5B is a chart showing data from a continuous 50-hour cooling test (using the setup of FIG. 5A) showing the ambient temperature, the temperature in the beaming system, and the temperature in the control system.
Figure 5C:
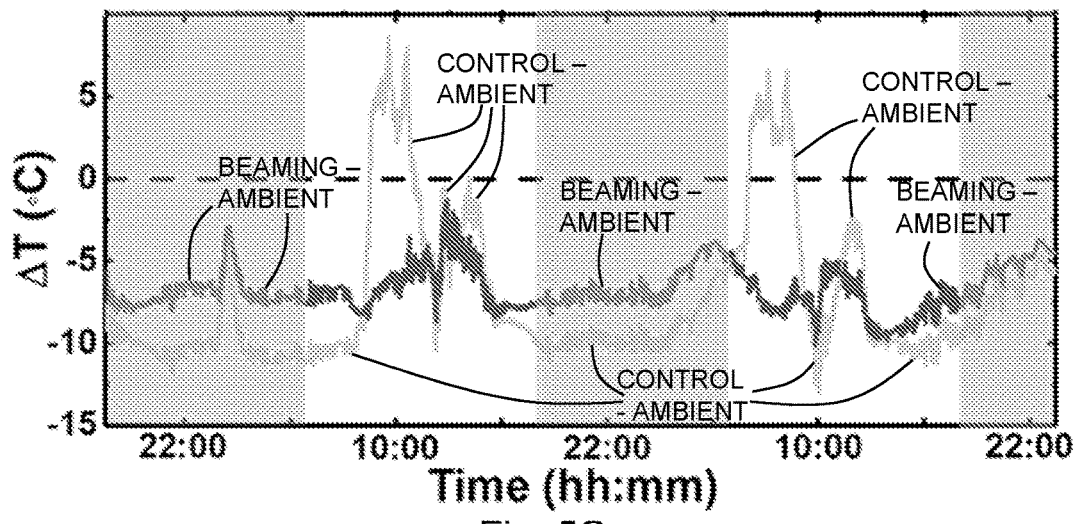
FIG. 5C is a chart showing temperature differences achieved by the setup of FIG. 5A in the beaming system and the control system.

Finally, we performed a continuous experiment at a co-author's backyard in Buffalo, NY from 6:00 p.m. on March 25 to 11:59 p.m. on Mar. 27, 2018 (with a clear sky and the relative humidity of ~35%). The peak irradiation of sunlight was ~853.5 W/m². As shown in FIG. 5A, we placed a beaming system and a control system (with no beaming architecture, i.e., the system with a shadow board used in FIG. 3C) on the ground, ~5 meter away from the door of the house. As shown in FIG. 5B, three temperature curves were recorded for the ambient, the beaming system, and the control system, respectively. Remarkably, the temperature in the beaming system was always lower than the ambient temperature. A spike was observed on the first night due to a thin cloud on the direct top sky, reflecting the weather-dependency of radiative cooling (see Note 4 below and FIGS. 9 and 10 for another outdoor experiment performed at Thuwal, Saudi Arabia with a complete different weather condition). To further illustrate the cooling performance, the temperature differences in these two systems are plotted in FIG. 5C, showing that the beaming system reduced the temperature by ~2-6° C. during the daytime and ~7-9° C. at nighttime, respectively. Although the planer PDMS cooling system realized slightly better cooling performance at night (~9-11° C.), its temperature was ~4-6° C. higher than the surrounding in the morning since the sunlight was not always blocked by the shadow board. The V-shaped shelter structure realized all-day radiative cooling, which is highly desired in practical applications.

Note 1. Preparation of Polydimethylsiloxane (PDMS) Planar Emitter

Polydimethylsiloxane (PDMS) was prepared by a one-step reaction. The precursors of PDMS include polysiloxanes (Silicone Elastomer Base from Dow Corning) and silicone resin solution (Silicone Elastomer Curing Agent from Dow Corning). Polysiloxanes was mixed with the silicone resin solution by the ratio of 10:1 (i.e., polysiloxanes: silicone resin solution=10:1) in a beaker. After being well blended, the mixture was put in a vacuum box to accelerate the outgassing process for two hours. The PDMS coating was operated using the blade coating method on a multicoater (RK K303 Multicoater). The uncoated substrate and the platform of the multicoater were cleaned using cleanroom wipers and 2-propanol (2-propanol VLSI Selectipur from BASF). The thickness of the PDMS coating was controlled by the micrometer adjuster of the coating blade. The coated substrate was then heated at 60° C. for two hours in an oven.

Note 2. Indoor Radiative Cooling Discussion

In the indoor radiative cooling simulation experiment, a liquid nitrogen system was used as the cold source. To analytically explain its cooling power using equation (1), we calculated the incident radiation powers from the ambient, $P_{amb}$, and from the cold source, $P_{cold\ source}$, using Eq. (3) and (4), respectively.

In equation (3), if emissivity of air, $\varepsilon_{air}(\lambda)$, is assumed to be ideal (i.e., $\varepsilon_{air}(\lambda)$ is zero from 8 to 13 μm and unity at other wavelengths), $P_{amb}$=120.89 W at 288K. Even if the actual atmosphere emissivity is considered, one can estimate that $P_{amb}$=122.46 W, which is close to 120.89 W. Therefore, for simplicity, here we consider $\varepsilon_{air}(\lambda)$ as the emissivity of an ideal emitter.

In equation (4), $P_{cold\ source}(T_{LN2})$ is negligible compared to other terms due to the low temperature of the liquid nitrogen (i.e., 77 K). To validate this assumption, we first calculate the upper limit of $P_{cold\ source}(T_{LN2})$: $\varepsilon_{LN2}(\lambda)$ is assumed to be unity over the entire spectrum considering the excellent optical emissivity of the black aluminum foil in liquid nitrogen. dΩ is integrated from zero to π. In this case, the upper limit $P_{cold\ source}(T_{LN2})$ is 0.03 W at $T_{dev}$=288K. In contrast, $P_{rad}(T_{dev})$=246.47 W, which is much larger than $P_{cold\ source}$. Therefore, $P_{cold\ source}(T_{LN2})$ is negligible in the indoor radiative cooling calculation using equation (1).

Note 3. Light Tracing Modeling

Figure 4D:
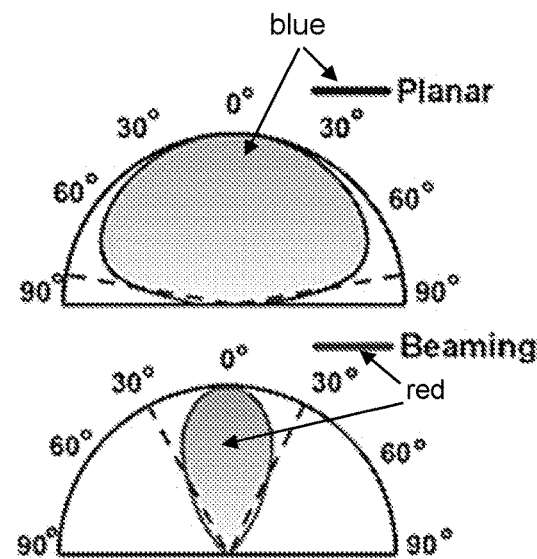
FIG. 4D shows the output thermal beam propagation distributions for a planar system (upper panel) and a beaming system (lower panel) in mid-infrared wavelength region (at 10 μm).
Figure 4E:
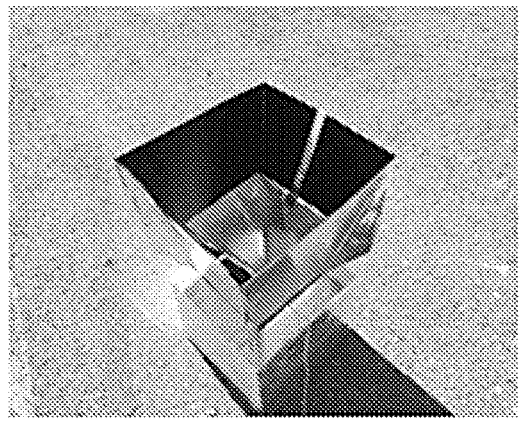
FIG. 4E is a photograph of a beaming system according to an embodiment of the present disclosure.
Figure 4F:
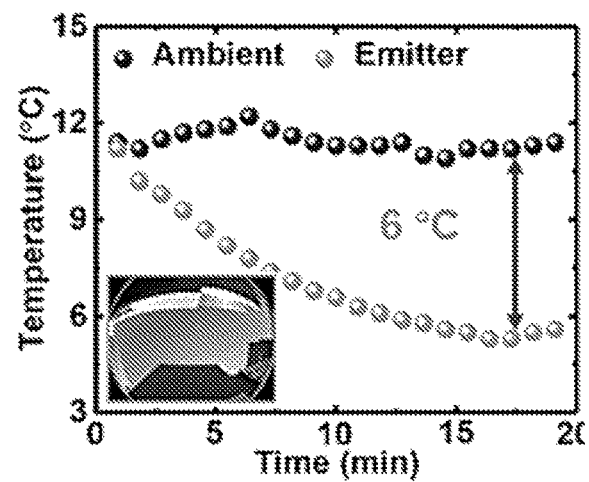
FIG. 4F is a chart showing outdoor experimental results at Location A (FIG. 3D).
Figure 4G:
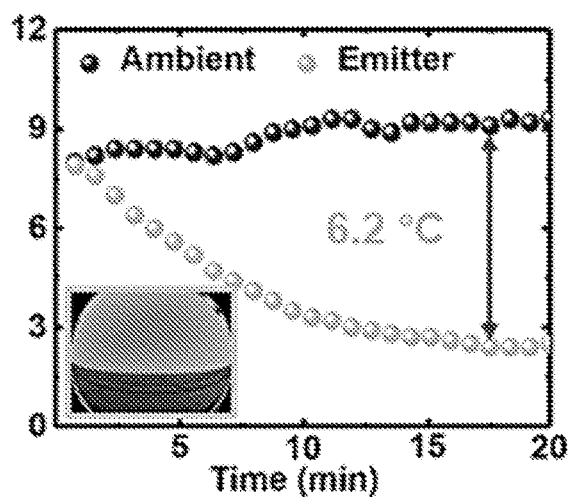
FIG. 4G is a chart showing outdoor experimental results at Location B (FIG. 3E).
Figure 4H:
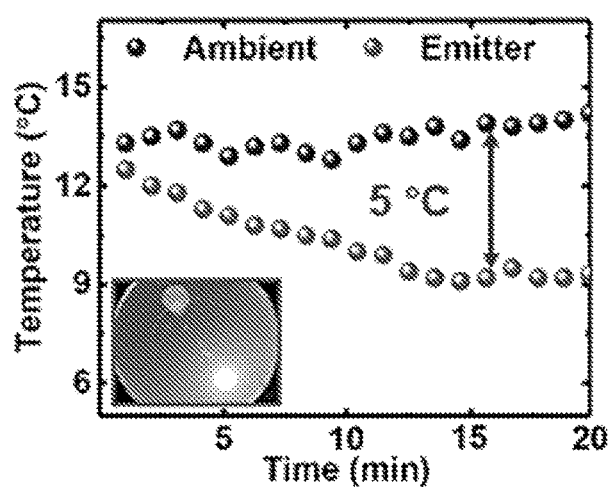
FIG. 4H is a chart showing outdoor experimental results at Location C (FIG. 3F).

The thermal beam tracing modeling shown in FIG. 4D was performed using LightTools (©2018 Synopsys, Inc.). The 3D model of the beaming structure was developed in Pro/ENGINEER Creo Suite (© PTC) and imported into the LightTools. To simulate the emission of the PDMS film, we introduced a surface with hemisphere emission pattern as the light source. Two different cases (with and without the beaming structure) were modeled in FIG. 4D to compare the difference introduced by the beaming structure. Dashed lines in FIG. 4D indicate the spatial angles where the emission intensity decreases to a half of the maximum value. One can see that the thermal emission from the planar system was approximately omnidirectional (i.e., the upper panel). With the beam control structure, the thermal emission was then confined with a relatively small spatial angle (i.e., the lower panel in FIG. 4D of the main text).

Note 4. Outdoor Radiative Cooling Experiment at Saudi Arabia

Figure 9:
FIG. 9 is a photograph of an outdoor test performed at King Abdullah University of Science and Technology (KAUST), Saudi Arabia.
Figure 10:
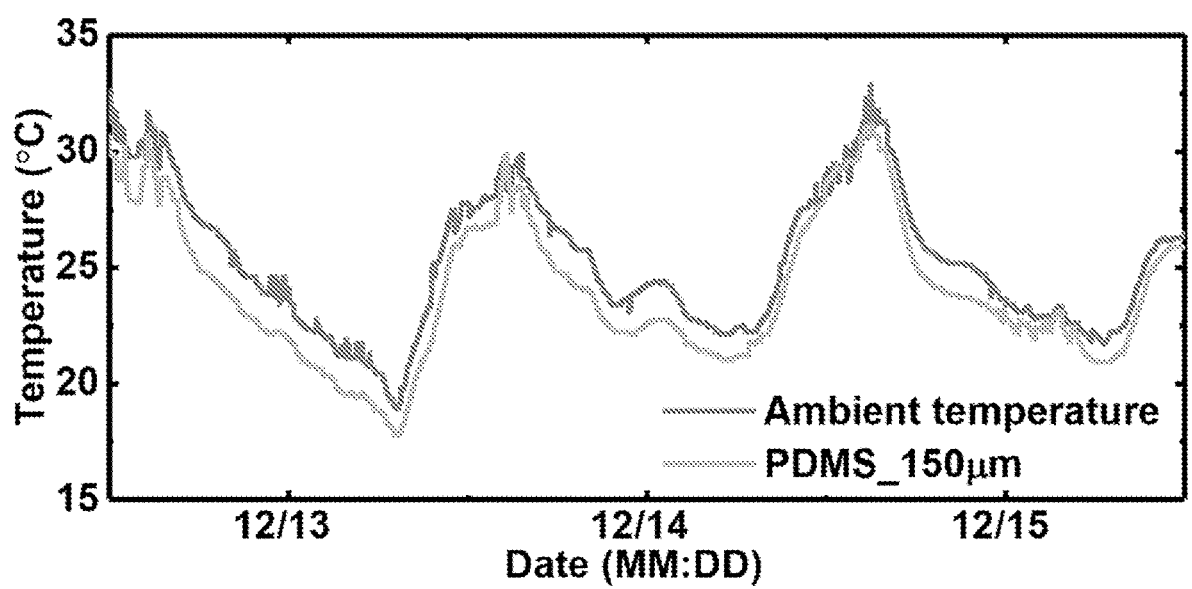
FIG. 10 is a chart showing data from a continuous radiative cooling test in Saudi Arabia, where the relative humidity of the local test environment was ~60% at night and ~50% during the day.

An outdoor radiative cooling experiment was conducted at KAUST, Saudi Arabia (FIG. 9). The experimental setup is similar to that in FIG. 3C described above. The cooling performance was characterized over 72 hours, as shown in FIG. 10. The average temperature reduction was ~2° C. at nighttime and less than 1° C. during the daytime. This performance was much lower than that obtained in Buffalo, NY, due to the different weather conditions: the relative humidity at Thuwal was ~60% at nighttime and ~50% during the daytime in October 2017 at Thuwal, Saudi Arabia. This high relative humidity significantly affected the transparency of the atmosphere to thermal radiation. This result indicates a weather-dependent performance of radiative cooling.

Graded Index Beam Guide

Sky cooling is an emerging thermal management strategy using outer space as the heat sink. Due to the transparency of the Earth's atmosphere in the wavelength range of 8-13 μm, any object can emit its heat through this spectral window and realize cooling effect. In recent years, many groups have attempted to discover biomimetic radiative cooling effects and develop high performance and low cost thermally-emissive metamaterials. Although various advanced thermal photonic materials with different spectral selection features have been reported, the measured cooling power of these devices is within the range of 45 W/m²-110 W/m² during the day and 63 W/m²-120 W/m² during the night, which can be attributed to the intrinsic optical and thermal characteristics of the material/system as well as actual weather conditions.

For a planar thin film thermal emitter, the top and bottom surfaces both emit thermal radiation. However, in previous designs, only the sky-facing surface causes a noticeable cooling effect, as reported in previous radiative cooling experiments. The bottom surface transfers thermal radiation towards the ground. Therefore, a waveguide strategy that can guide the thermal emission from the two surfaces to the sky will break the cooling power limit of the single-side thermal emitter.

In some embodiments, a graded-index beam guide is provided. In some embodiments, a graded nanocomposite metamaterial (GNM) spectrum selector is provided to function as a solar absorber as well as a thermal radiation waveguide/mirror. Embodiments of this structure are capable of absorbing over 90% of electromagnetic radiation in the solar spectrum and over 90%, while also maintaining a reflection of over 90% in the mid-infrared region, including 8-13 μm. When a vertical thermal emitter is well coupled with this spectral selector (see, for example, FIGS. 11A and 16), its thermal emission can be mostly reflected to the sky while the solar input is absorbed by the thermal selector simultaneously. In this case, the requirement for the sky-facing thermal emitter is unnecessary. As a result of this configuration, both sides of a planar thermal emitter can be used to emit heat and realize a record high cooling power of over 280 W/m² in a laboratory environment, twice as much as the previous reported cooling power from the single sky-facing surfaces. In a test embodiment using simple foam boxes with no special vacuum thermal isolation, a temperature reduction of 14.5° C. below the ambient temperature was realized in a laboratory environment and a reduction of over 12° C. was realized in an outdoor test, under standard atmospheric pressure. This strategy can simultaneously achieve solar heating and radiative cooling in the same system (FIG. 11A): the GNM plates simultaneously absorb the incident sun light and direct the thermal radiation from the emitter to the sky, enabling the radiation cooling of vertical objects that have no direct access to the clear sky, and paving the way toward wider applications in hybrid solar heating and radiative cooling utilities.

Figure 11A:
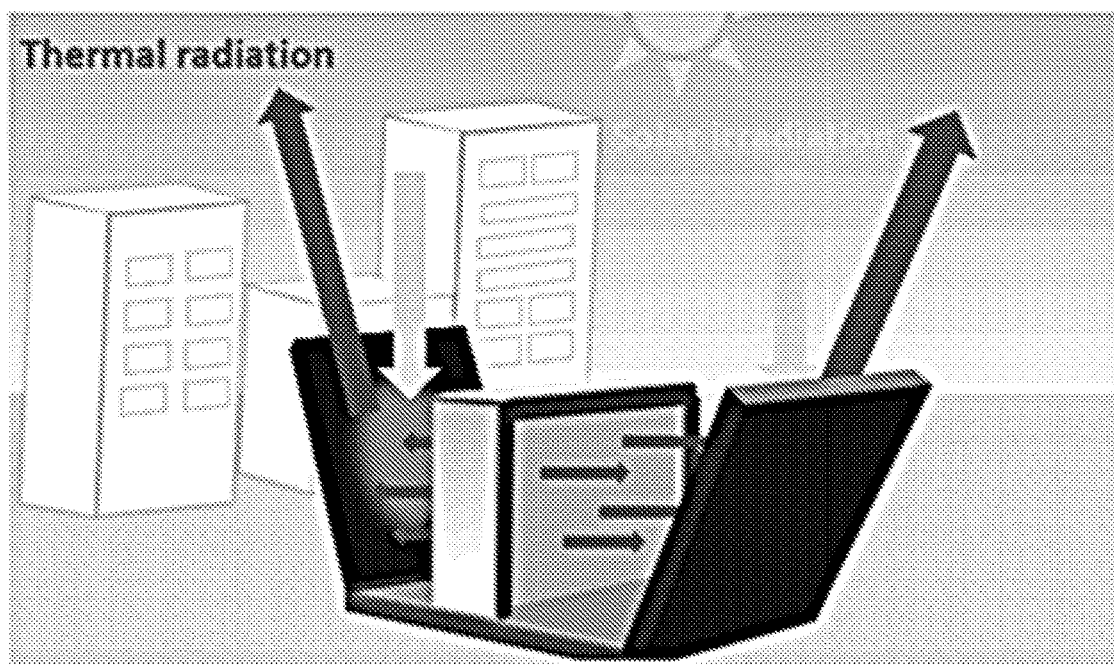
FIG. 11A. Schematic of an exemplary double-sided setup. The GNM plates absorb the solar irradiance and couple thermal radiation from each side of the emitter.
Figure 11B:
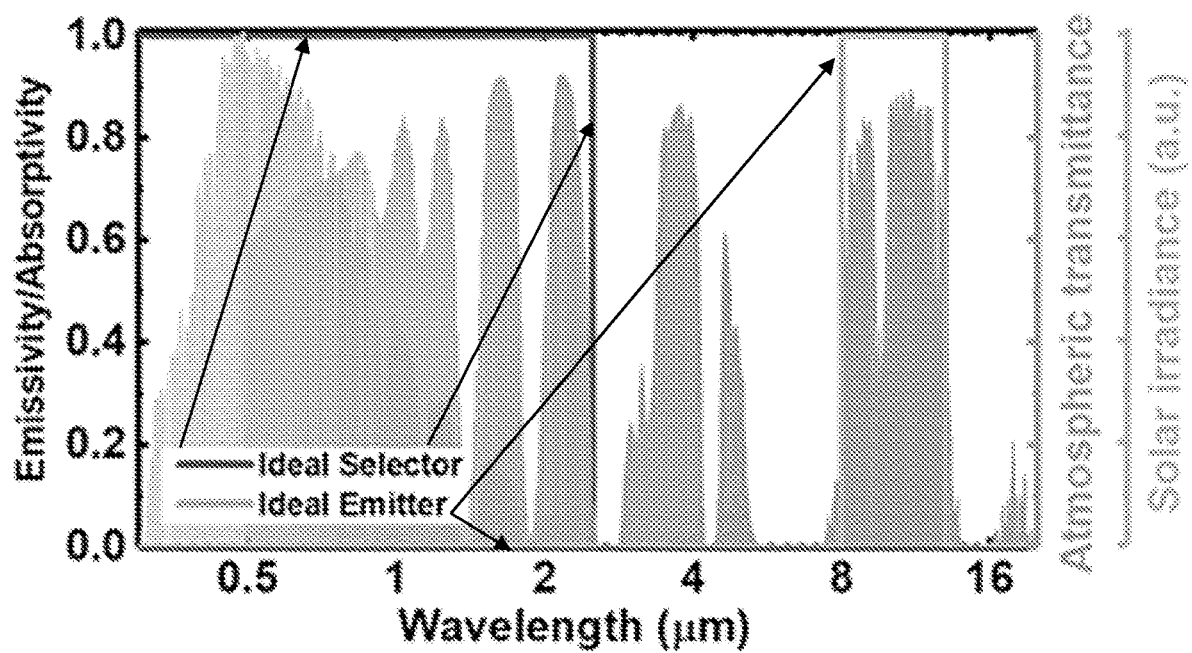
FIG. 11B. Emissivity of the ideal case.

An ideal spectral selector for radiative cooling should efficiently absorb solar light and reflect thermal radiation simultaneously (FIG. 11B). To realize this two-fold thermal optical functionality, the present disclosure provides a GNM film such as the film illustrated in FIG. 11C. In an exemplary embodiment, a Ag/SiO$_2$ mixture ratio of the GNM film changes gradually, resulting in a graded index medium that can absorb solar light and minimize the back scattering efficiently.

Figure 11C:
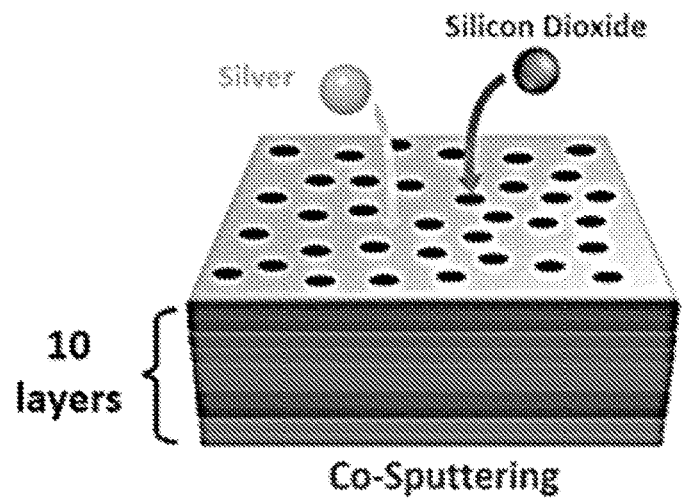
FIG. 11C. Schematic of an exemplary GNM deposition sequence. The mixture of Ag and $SiO_2$ was deposited by ten layers with different ratio simultaneously.
Figure 11D:
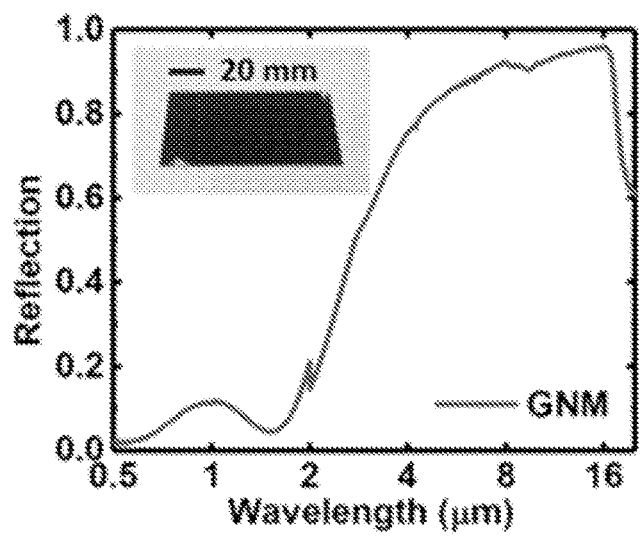
FIG. 11D. Measured reflection spectrum of the GNM plates. The inset image shows the GNM plate with a scale bar.
Figure 11E:
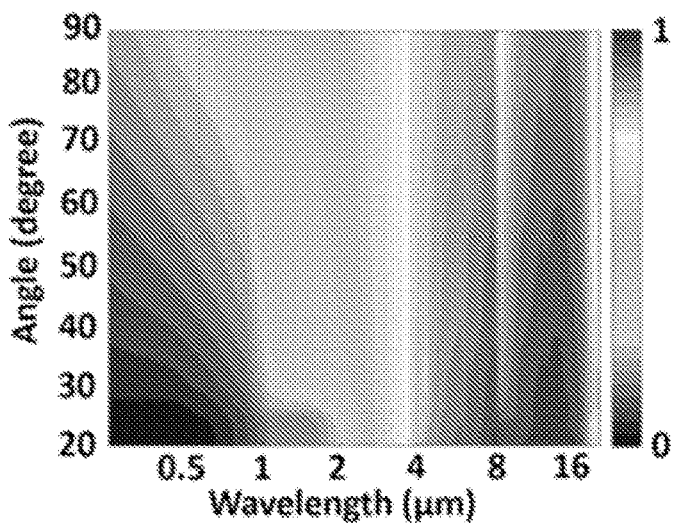
FIG. 11E. Measured angular-dependent reflection spectrum of GNM plates.

In this experiment, ten layers of co-sputtered Ag—SiO$_2$ nanocomposite films were stacked to construct the graded index film on a polished aluminum substrate (labeled as Layer 1 to Layer 10 in FIG. 11C). It will be recognized that such films may include fewer than ten layers or more than ten layers. In the experimental embodiment, the nominal thickness of each layer was ~30 nm. As a result, a strong solar absorber was realized. As shown by the inset of FIG. 11D, the GNM film of the experimental embodiment was dark in color. Its reflection from 500 to 2000 nm was below 20%. Intriguingly, its reflection increased rapidly and remained over 90% throughout the mid-IR spectral range, covering the radiative cooling spectrum of 8-13 μm. Remarkably, this superior spectral selection feature can be retained over a broad incident angle range. As shown in FIG. 11E, the normal optical absorption is over 90% in the solar spectral regime, and the reflection is over 95% in the 8-13 μm range. This superior feature can be retained up to 50°.

Figure 12G:
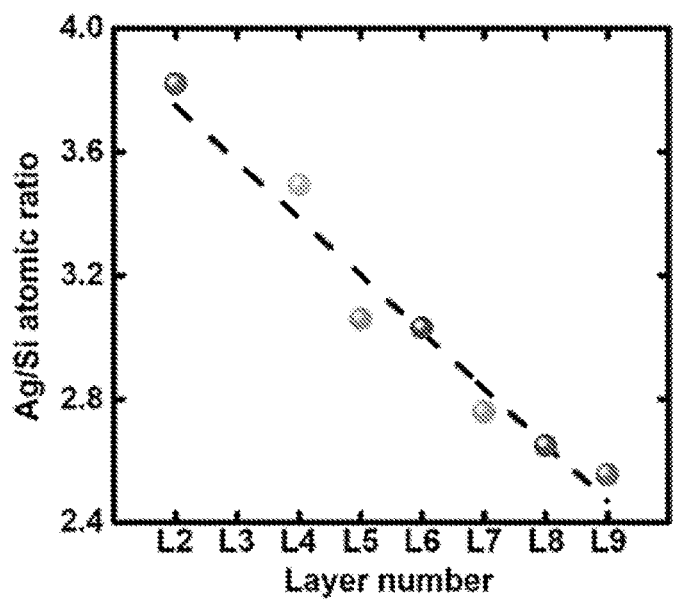
FIG. 12G. Ag/Si atomic ratio for each layer of the exemplary GNM film.
Figure 12H:
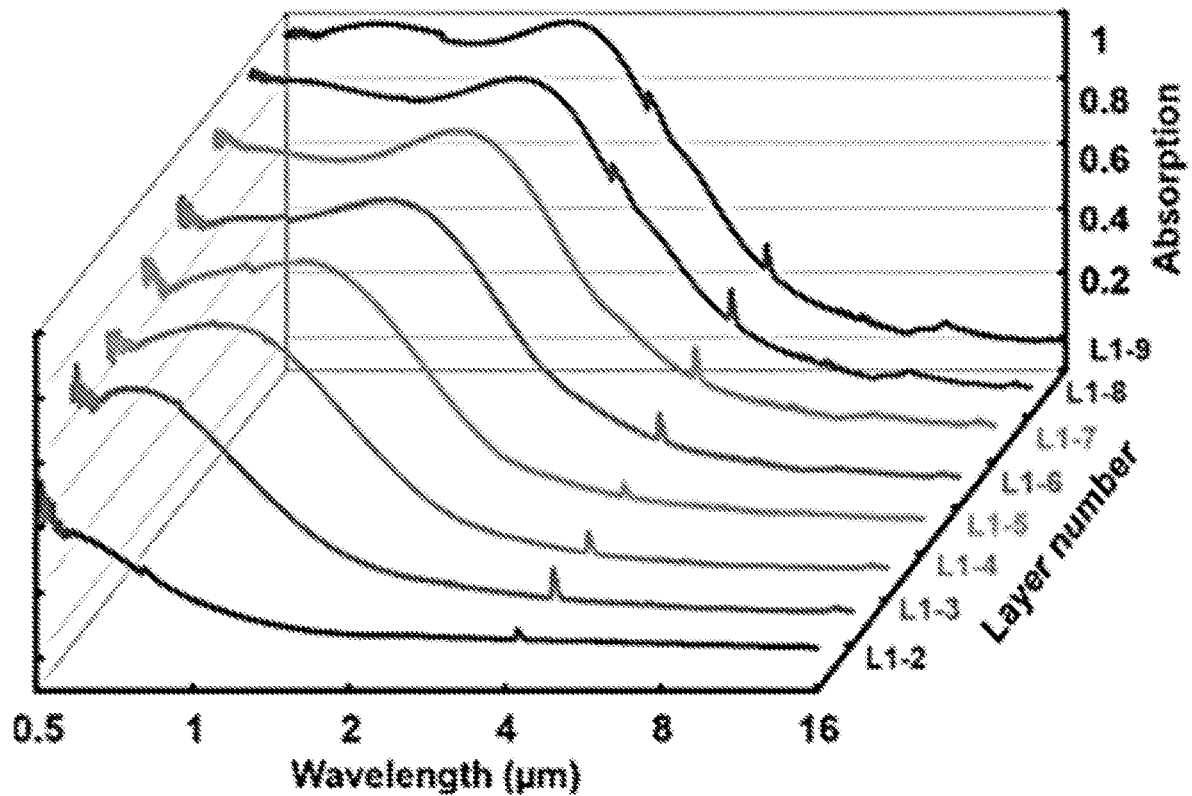
FIG. 12H. Absorption spectrum of GNM samples with different number of stacked layers: Layer 1-2 to Layer 1-9, respectively.

FIG. 12A shows a cross-sectional scanning electron microscopic (SEM) image of the GNM film (indicated by the arrow), showing the graded profile of the Ag—SiO$_2$ composite (a top gold sacrificial layer was deposited for easier SEM characterization). To validate the graded index film, we performed energy dispersive X-Ray spectroscopy (EDS) of the film, which shows the graded distribution of Si (FIG. 12B) and Ag elements (FIG. 12C), respectively. To further show the microscopic morphology of the GNM film, we fabricated a reference sample for each layer of the graded Ag—SiO$_2$ nanocomposite film. As shown in FIGS. 12D-12F, the transmission electron microscopy (TEM) images for three layers (L3, L5 and L8) demonstrate the different Ag—SiO$_2$ mixture ratios. One can see that the SiO$_2$ particles with the dimension of 20-40 nm were embedded in the continuous Ag film. To show their graded distributions, we analyzed the Ag/Si atomic ratio for each layer of the GNM film in FIG. 12G. One can clearly see the monolithically graded distribution of the Ag/Si atomic ratio, indicating that the designed graded Ag—SiO$_2$ nanocomposite film was realized. To reveal the optical absorption feature of this graded index film, the optical absorption spectra of GNM films with different numbers of layers were characterized in FIG. 12H. One can see that the optical absorption in the visible to mid-infrared spectral range was improved due to the reduced impedance mismatch with the dielectric environment. Remarkably, the unique strong reflection in mid-infrared regime is particularly attractive for radiative cooling. This GNM film efficiently absorbs solar energy and reflect thermal radiation simultaneously, enabling its application as a spectral selector for direction guided radiative cooling.

Figure 13A:
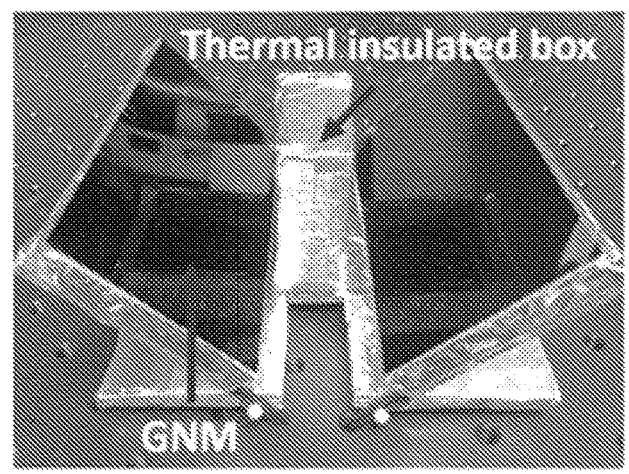
FIG. 13A. A photo of V-shaped double-side apparatus with GNM plates.
Figure 13B:
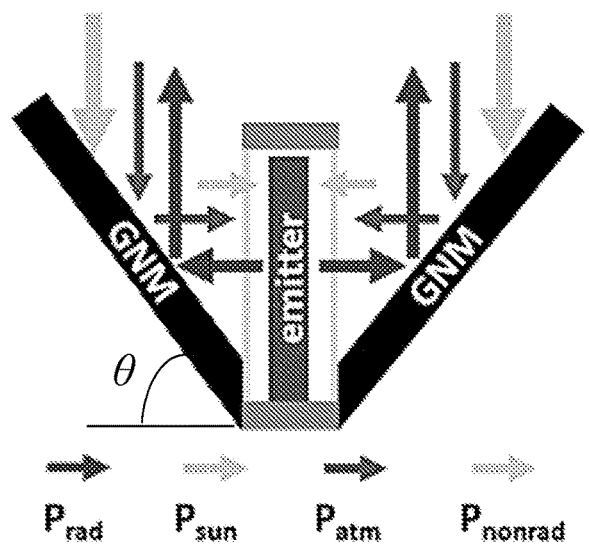
FIG. 13B. Diagram of the power tradeoff in V-shaped double-side system.
Figure 13C:
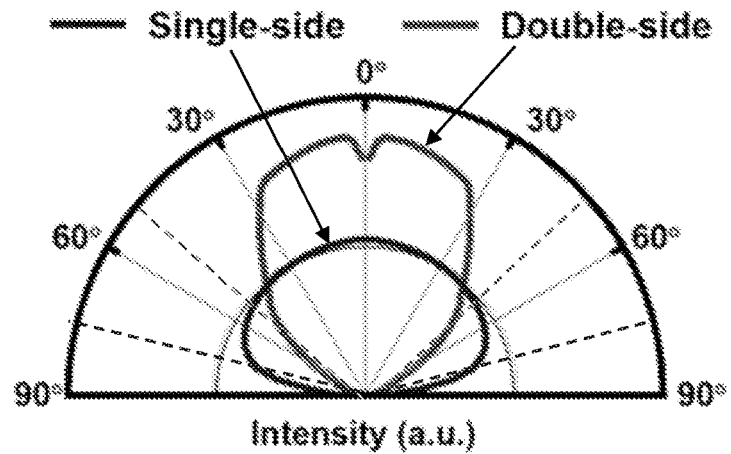
FIG. 13C. The modeled angular emissivity of V-shaped double-side system.

Using the GNM plates, we fabricated a V-shaped beam guide (mirror structure) and measured its radiative cooling performance in the laboratory environment. As shown in FIG. 13A, the vertically-aligned thermal emitter (e.g., thin-film thermal emitter) was sealed in a thermally insulated box at the center of the V-structure. As a result, thermal radiation from both sides of the emitter was directed to the remote heat sink (i.e., the sky). Simultaneously, the solar input can be largely absorbed by the GNM plates (see the energy balance in FIG. 13B). As shown in FIG. 13C, we modeled the angular distribution of the thermal radiation at the wavelength of 10 μm. With the bottom angle (θ) of 60°, the divergent angle of the thermal emission from the double-sided system is 93.6°. Compared with the thermal radiation pattern from a sky-facing single-surface system (see FIG. 13C), most of the thermal emission reflected by the V-shaped structure was confined within ±46.8° (see FIG. 13C), enabling a great beam-shaping effect to the thermal radiation. Depending on the spectral selective property of the GNM mirror, this V-shaped architecture can result in a record-breaking radiative cooling performance since the thermal emission from both sides of the planar emitter are effective.

Figure 13D:
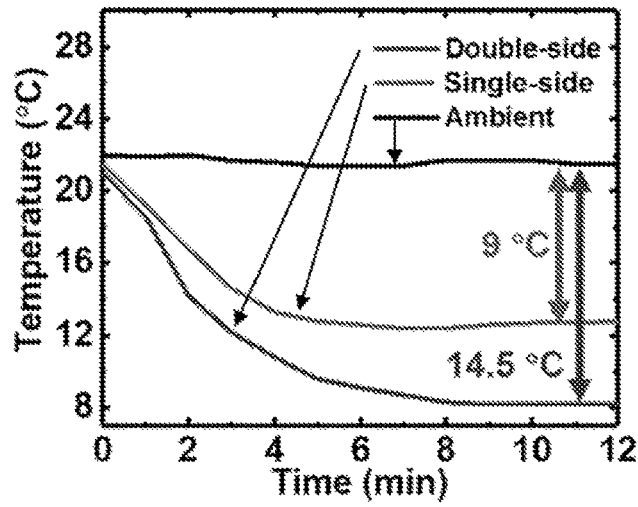
FIG. 13D. Temperature measurement of single-side system and double-side system in the laboratory radiative cooling test.
Figure 13E:
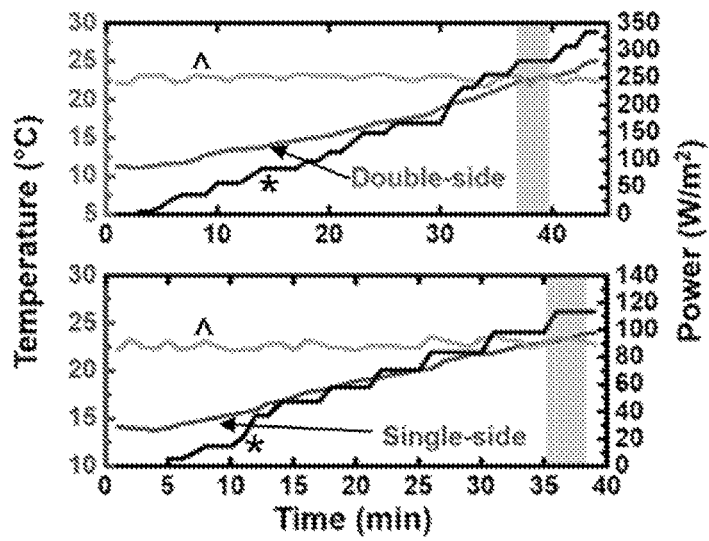
FIG. 13E. A plot of the surface temperatures of the planar emitters in exemplary double-sided and single-sided embodiments.

To validate this hypothesis, we first employed liquid nitrogen as the cold source in an indoor experiment. For this experiment, black aluminum was used as the planar thermal emitter due to its near unity absorption over the IR spectrum range. As shown in FIG. 13D, the temperature of the double-sided system was reduced by ~14.5° C., ~5.5° C. lower than the control system (i.e., ~9.0° C.). To experimentally reveal this record breaking cooling power, we introduced a heater at the bottom of the thermal emitter to heat its surface to the ambient temperature. As shown in FIG. 13E, the surface temperatures of the planar emitters in the double-sided system and single-sided system were plotted by the curve labeled "Double-side" in the upper panel and the curve labeled "Single-side" panel, respectively.

Figure 13F:
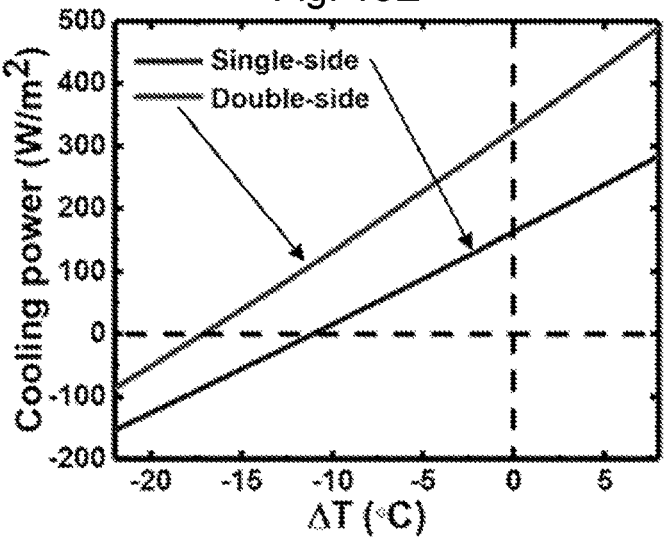
FIG. 13F. At an ambient temperature of 23° C. (i.e., at ΔT=0, indicated by the vertical dashed line), the cooling power of the double-sided system reaches ~327.2 W/m².

When they reached the ambient temperature (i.e., the light gray, ^-labeled curves in FIG. 13E), the measured cooling powers were ~280.7 W/m² for the double-sided system and 113.7 W/m² for the single-sided system (see the *-labeled curves in the shaded regions in FIG. 13E), agreeing well with the prediction. To further evaluate the measured cooling performance compared with the theoretical upper limit, we calculated the cooling power density of an ideal blackbody emitter as a function of the temperature difference, ΔT. As shown in FIG. 13F, at an ambient temperature of 23° C. (i.e., at ΔT=0, indicated by the vertical dashed line in FIG. 13F), the cooling power of the double-sided system reaches ~327.2 W/m², two-fold of the one for the single-sided system (i.e., ~163.6 W/m²). If the emitter reaches equilibrium (see the horizontal dashed line in FIG. 13F), the ideal emitter can realize a temperature reduction of ~17.4° C. in the double-sided system, and 11.2° C. in the single sided system, respectively. Therefore, the indoor experimental results are very close to the theoretical upper limits without consideration solar input.

Figure 14A:
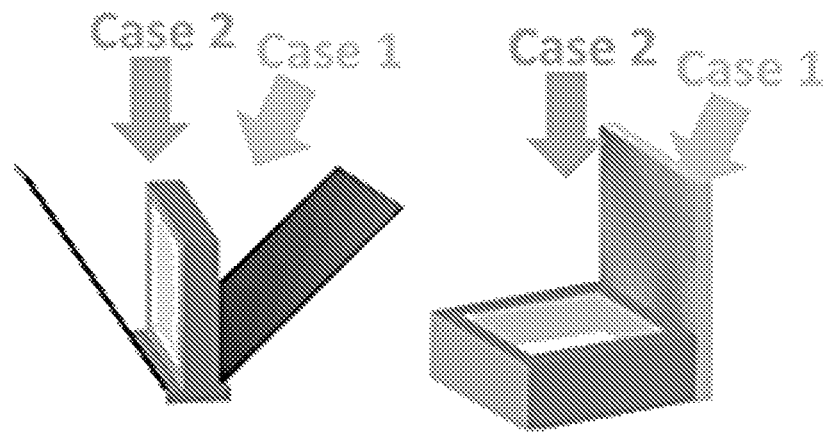
FIG. 14A. Schematic of the daytime radiative cooling test in Buffalo, New York.
Figure 14B:
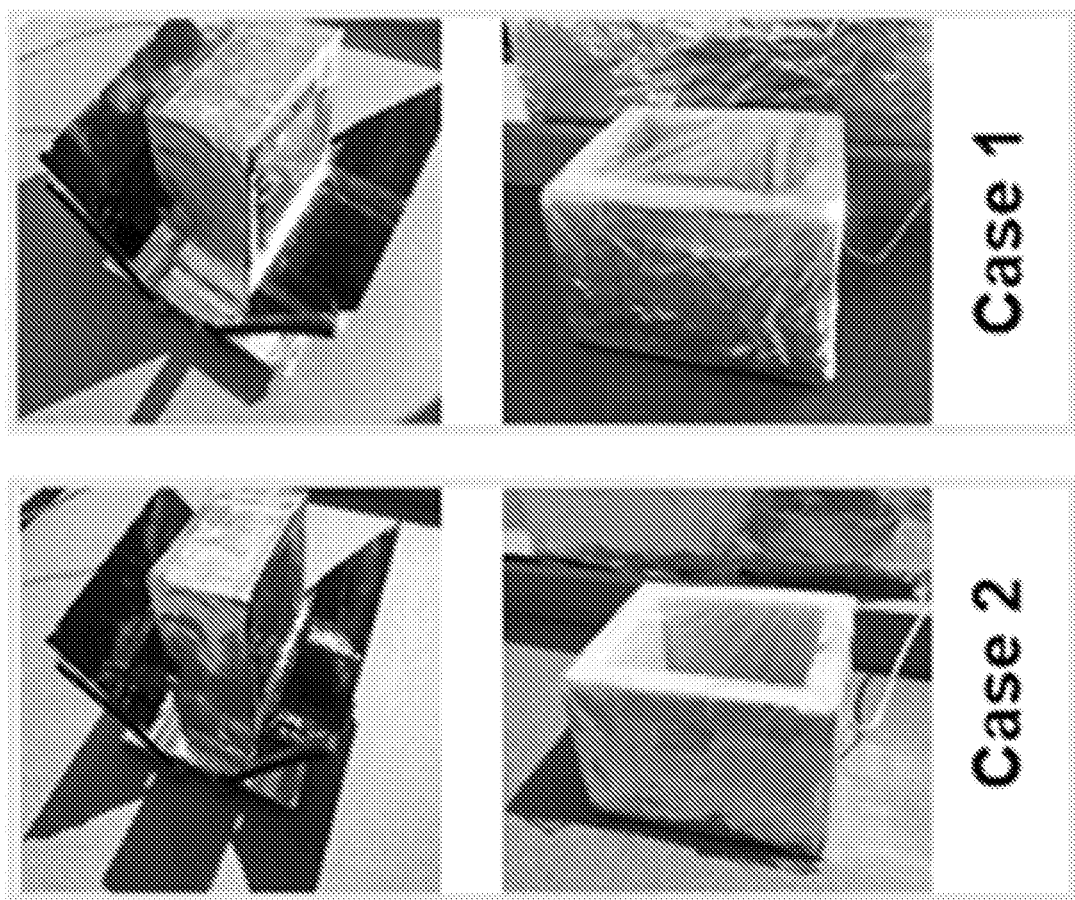
FIG. 14B. Photos of the outdoor radiative cooling measurement.
Figure 14C:
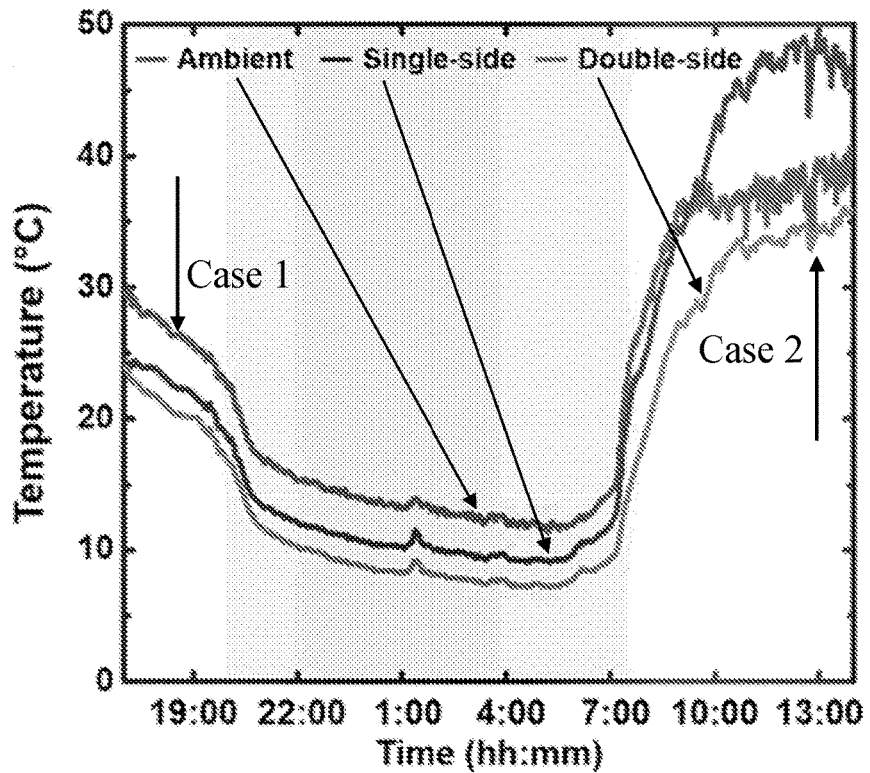
FIG. 14C. Temperature measurement of the double-side system and single-side system with black aluminum and with PDMS film. The double-sided system achieves a steady-status temperature reduction of 12° C.±1.2° C. The single-sided systems achieve barely the sample temperature reduction of 8° C.±1.5° C.

To demonstrate the superior cooling capability of the proposed double-side emitter structure with GNM plates, we performed outdoor measurements in Buffalo, NY. A single-sided control experiment was performed simultaneously. In these two systems, inexpensive and solar-transparent PDMS films were anchored at the center of the thermally insulating boxes to serve as the thermal emitter (FIG. 14A). Photographs of the experimental setup are shown in FIG. 14B: a highly reflective board was used to shelter the control system from sun light, while the double-sided emitter system was directly exposed to the sun. We performed a 24-hour continuous outdoor test in Buffalo, NY on Aug. 4-Aug. 5, 2019 (with a humidity from 30% to 95% in the day and night). Due to the vertical alignment of the thermal emitter in the double-sided system, the cooling performance of the system is very different from the single-sided system because of the different optical paths for solar input. As shown by Case 1 in FIG. 14B, the incident sun light was blocked by the planar shelter for the control system but cannot be blocked by the GNM plate for the double-sided system. Because of this occurring, the cooling performance of the double-sided system will suffer. Even in this situation, only one side of the thermal emitter can be directly illuminated. As long as the absorbed solar energy by the PDMS film is below 280 W/m² (i.e., the solar absorption is below 30% of the AM1.5 solar power, 1000 W/m², which is easy for most transparent thermal emitter materials), sub-ambient cooling is still realizable in this simple double-sided emitter architecture, with no need of expensive sun tracking systems. One can see that at 18:44 in FIG. 14C (arrow labeled Case 1), the double-sided system realized a temperature reduction of 6.2° C., while the ΔT in the control system is 4.2° C. This was the moment of lowest performance throughout the test. As the solar input intensity rose throughout the day, and peaked at noon (i.e., Case 2 in FIG. 14B), the direct sun light began to be blocked by the roof of the thermally insulating box of the double-sided system. During this moment, the large solar shelter was incapable of blocking the normal incidence. Therefore, the cooling performance of the double-sided emitter system is superior over the single-sided system, especially under normal solar incidence when air-conditioning is the most demanding. As shown in FIG. 14C, the temperature inside the single-side system is ~10° C. higher than the ambient temperature at 12:58 pm (arrow labeled Case 2). In contrast, the double-sided system retained a temperature reduction of ~4.5° C. By reviewing the overall performance of the two systems shown in FIG. 14C, the double-sided system realized all-day sub-ambient cooling, including the early morning, evening and nighttime.

Figure 14D:
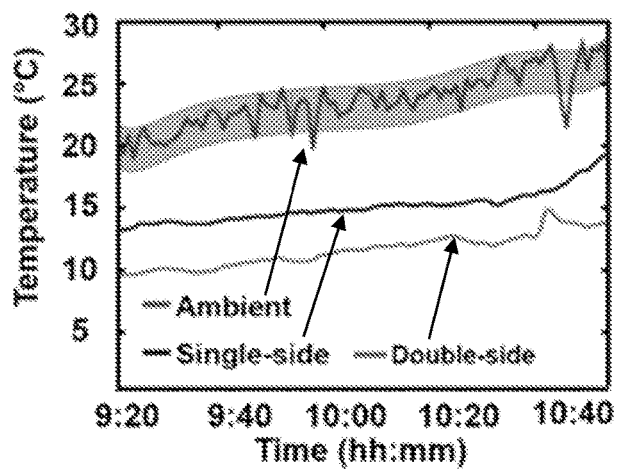
FIG. 14D. Shows the temperature measurement over a shorter period of time 9:20-10:40 a.m.
Figure 14E:
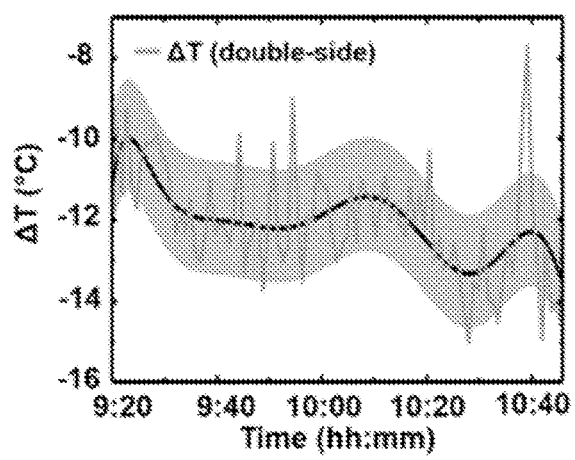
FIG. 14E. Shows the ΔT over the same shorter period as FIG. 14D.

It should be noted that the radiative cooling performance is heavily dependent on weather conditions. During May-August 2019, we performed outdoor experiments on selected sunny days. The best result was obtained on May 21, 2019 (with a very clear sky and the humidity of ~17% during the experiment time). As shown by the curve labeled Ambient in FIG. 14D, obvious fluctuation were observed in the ambient temperature due to the relatively strong wind. To better reveal the reduced temperature, we plot the ΔT curve of the double-sided system in FIG. 14E. From 9:20 a.m. to 11:00 a.m., the average temperature reduction of the double-sided emitter system was 12° C.±1.2° C., corresponding to a cooling power of 261.5 W/m². This is the record high temperature reduction and cooling power obtained with this simple system, and with no special thermal insulation. In contrast, the control system realized a temperature reduction of 8° C.±1.5° C., corresponding to a cooling power of 102.3 W/m².

A highly efficient and low-cost passive cooling technology by exploiting the sky as a cold source. Embodiments of the present planar PDMS/Al cooling structures efficiently send invisible, heat-bearing light within the transparent window of the Earth's atmosphere (i.e., 8-13 μm) directly into the cold outer space. Using a spectral selective shelter component to suppress solar input during the daytime, embodiments of this technology produced a cooling effect at 2~11° C. below-ambient temperatures with a cooling power of up to 120 W/m². Such passive cooling did not consume energy or produce greenhouse gases. Furthermore, due to the controlled thermal emission enabled by a tapered thermal light waveguide, the presently-disclosed beaming radiative cooling system is insensitive to the surrounding building architecture, which is therefore suitable for implementation in urban environments. All-day continuous cooling was experimentally demonstrated on a typical sunny day in Buffalo, NY. The large-scale production cost of the disclosed surface structure is expected to be highly competitive compared to traditional active cooling methods (e.g., electric air-conditioning) because of almost zero cost of operation. The disclosed technology thus has disruptive potential in transforming cooling solutions in a wide range of industrial and residential applications.

Additionally, we developed a GNM that can selectively absorb solar light and reflect mid-infrared light efficiently. Using such GNM plates, a V-shaped architecture was built to couple the thermal radiation from both sides of the planer emitter to the sky, and realize a record high cooling power of over 280 W/m². Under one atmospheric pressure and simple thermal isolation using foam boxes, we demonstrated a record temperature reduction of 14.5° C. in a laboratory environment, and 12° C.±1.2° C. in the outdoor test. Importantly, this GNM plate allows for a powerful hybrid system to be realized: i.e., one that utilizes both solar energy, as well as sky (radiative) cooling. In recently reported radiative cooling works, solar input and its heating effect are always undesired to the cooling system. In other words, the solar energy input of 800~1000 W/m² was largely wasted (i.e., scattered or reflected). To combat this wasted energy, the proposed GNM plate separated the solar heating and the radiative cooling in two different locations in our system: according to our measurement, the temperature of the GNM plates is ~54° C. from 9:00 a.m. to 11:00 a.m. in FIG. 14D under the illumination of the solar input of ~1010 W/m². Therefore, the double-sided emitter system can provide a 2-in-1 solution to integrate the cooling and heating into a single system perfectly: i.e., simultaneously provide a cold source and a heat source for residential applications. In this way, a hybrid solar-heating and radiative cooling system can contribute to cut the budget for both cooling and heating simultaneously.

Embodiments of the disclosure may cool any material including gases, liquids, and/or solids. For example, in a cooler with a single-sided emitter (such as that illustrated in FIG. 15A), the material to be cooled may be in contact with the second side of the emitter. In a cooler with a double-sided emitter (such as that illustrated in FIG. 16), the material to be cooled may be in contact with a top side, bottom side, or other sides of the substrate and/or an internal structure of the substrate such as one or more channels.

Although the present disclosure has been described with respect to one or more particular embodiments, it will be understood that other embodiments of the present disclosure may be made without departing from the spirit and scope of the present disclosure.

What is claimed is:

1. A passive cooler, comprising:
    a thermal emitter having a substrate and a coating disposed on at least a portion of a first side of the substrate; and
    a beam guide made from a material configured to absorb more than 40% of incident light at wavelengths <~4 μm and to absorb less than 40% of incident light at wavelengths from ~4~13 μm, and wherein the beam guide is configured such that at least a portion of incident light is acted on by the beam guide before reaching the thermal emitter.

2. The passive cooler of claim 1, wherein the beam guide has an optical index which is graded over at least a portion of a thickness of the beam guide.

3. The passive cooler of claim 2, wherein the beam guide comprises a graded index film.

4. The passive cooler of claim 3, wherein the graded index film comprises metal particles, and the density of metal particles varies over at least a portion of a thickness of the film.

5. The passive cooler of claim 4, wherein the graded index film comprises SiO2, and the density of SiO2 varies over at least a portion of a thickness of the film.

6. The passive cooler of claim 5, wherein the graded index film comprises two or more layers, and wherein at least one layer having a density of Ag and/or $SiO_2$ which is different than a corresponding density of at least one other layer.

7. The passive cooler of claim 1, wherein the beam guide is configured to absorb more than 40%, 50%, 60%, 70%, or 80% (or any value therebetween) of incident light at wavelengths <~4 μm.

8. The passive cooler of claim 1, wherein the beam guide is configured to absorb less than 40%, 30%, 20%, 10%, or 5% (or any value therebetween) of incident light at wavelengths from ~4~13 μm.

9. The passive cooler of claim 1, wherein the coating of the thermal emitter is configured to absorb less than 20% of incident sunlight at wavelengths <2 μm.

10. The passive cooler of claim 1, wherein the substrate is a metal.

11. The passive cooler of claim 10, wherein the substrate is aluminum.

12. The passive cooler of claim 1, wherein the coating is polydimethylsiloxane (PDMS).

13. The passive cooler of claim 1, further comprising a transparent cover spaced apart from the first side of the substrate.

14. The passive cooler of claim 1, wherein a second side of the substrate has a coating.

15. The passive cooler of claim 14, further comprising a transparent cover spaced apart from the first side and the second side of the thermal emitter.

16. The passive cooler of claim 1, further comprising a housing having one or more insulative walls, wherein the insulative walls together with a second side of the thermal emitter define a chamber such that the second side of the substrate is exposed to the chamber.

17. The passive cooler of claim 1, wherein the beam guide further comprises:
    a tapered outer member having a spectrally-selectively inner surface configured to reflect mid-infrared light and absorb visible light and near-infrared light; and
    a cooperating inner member having a spectrally-selective outer surface configured to cooperate with the outer member to guide incident mid-infrared light towards the thermal emitter.

* * * * *